US012172634B2

(12) United States Patent
Tokuhiro et al.

(10) Patent No.: US 12,172,634 B2
(45) Date of Patent: Dec. 24, 2024

(54) PARKING ASSISTANCE METHOD AND PARKING ASSISTANCE DEVICE

(71) Applicant: Panasonic Intellectual Property Management Co., Ltd., Osaka (JP)

(72) Inventors: Takafumi Tokuhiro, Kanagawa Ken (JP); Masashi Hoshino, Tokyo To (JP); Satoshi Fukumoto, Tokyo To (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 252 days.

(21) Appl. No.: 17/873,924

(22) Filed: Jul. 26, 2022

(65) Prior Publication Data

US 2023/0068889 A1    Mar. 2, 2023

(30) Foreign Application Priority Data

Aug. 31, 2021 (JP) .................................. 2021-141604

(51) Int. Cl.
*B60W 30/06* (2006.01)
*B60W 50/14* (2020.01)
*G06V 20/56* (2022.01)

(52) U.S. Cl.
CPC ............ *B60W 30/06* (2013.01); *B60W 50/14* (2013.01); *G06V 20/56* (2022.01);
(Continued)

(58) Field of Classification Search
CPC ..... G06V 20/56; G06V 20/586; B60W 30/06; B60W 50/14; B60W 2540/215;
(Continued)

(56) References Cited

U.S. PATENT DOCUMENTS

2013/0085637 A1*  4/2013  Grimm .............. B62D 15/0285
                                                        701/25
2014/0055615 A1*  2/2014  Chen ................... B62D 15/028
                                                        348/148
(Continued)

FOREIGN PATENT DOCUMENTS

JP    2006-321291    11/2006
JP    6022447        11/2016
(Continued)

OTHER PUBLICATIONS

Office Action from Japan Patent Office (JPO) in Japnese Patent Appl. No. 2021-141604, dated Nov. 12, 2024, together with an English language translation.

*Primary Examiner* — Sisay Yacob
(74) *Attorney, Agent, or Firm* — Greenblum and Bernstein, P.L.C.

(57) ABSTRACT

A parking assistance method according to the present disclosure is a method of performing autonomous travel of a vehicle based on a travel route generated using teaching travel by a driver. The parking assistance method including: acquiring as absolute position and an azimuth is the a travel direction of the vehicle; and determining, based on the absolute position and the azimuth in the travel direction, whether or not the vehicle is located oriented with a prescribed azimuth in a prescribed position, which are registered in association with the travel route.

20 Claims, 14 Drawing Sheets

(52) U.S. Cl.
CPC . *B60W 2050/146* (2013.01); *B60W 2420/403* (2013.01); *B60W 2540/215* (2020.02); *B60W 2556/10* (2020.02)

(58) Field of Classification Search
CPC ....... B60W 2556/10; B60W 2050/146; B60W 2420/403
See application file for complete search history.

(56) References Cited

U.S. PATENT DOCUMENTS

| | | | |
|---|---|---|---|
| 2016/0288833 A1* | 10/2016 | Heimberger | B62D 15/0285 |
| 2017/0227967 A1* | 8/2017 | Bariant | B60W 30/08 |
| 2019/0009773 A1* | 1/2019 | Miyahara | B62D 15/0285 |
| 2020/0108836 A1* | 4/2020 | Tanaka | B62D 6/002 |
| 2020/0140011 A1 | 5/2020 | Hirata et al. | |
| 2022/0340126 A1* | 10/2022 | Gao | B60W 30/06 |
| 2023/0023349 A1* | 1/2023 | Pathak | B60W 50/14 |

FOREIGN PATENT DOCUMENTS

| | | |
|---|---|---|
| JP | 2018-184149 | 11/2018 |
| JP | 2019-137158 | 8/2019 |

* cited by examiner

| No. | ABSOLUTE POSITION | AZIMUTH | TRAVEL ROUTE |
|---|---|---|---|
| 1 | LATITUDE: n1, LONGITUDE: m1 | SOUTH | FIRST TRAVEL ROUTE |
| 2 | LATITUDE: n2, LONGITUDE: m2 | WEST | SECOND TRAVEL ROUTE |

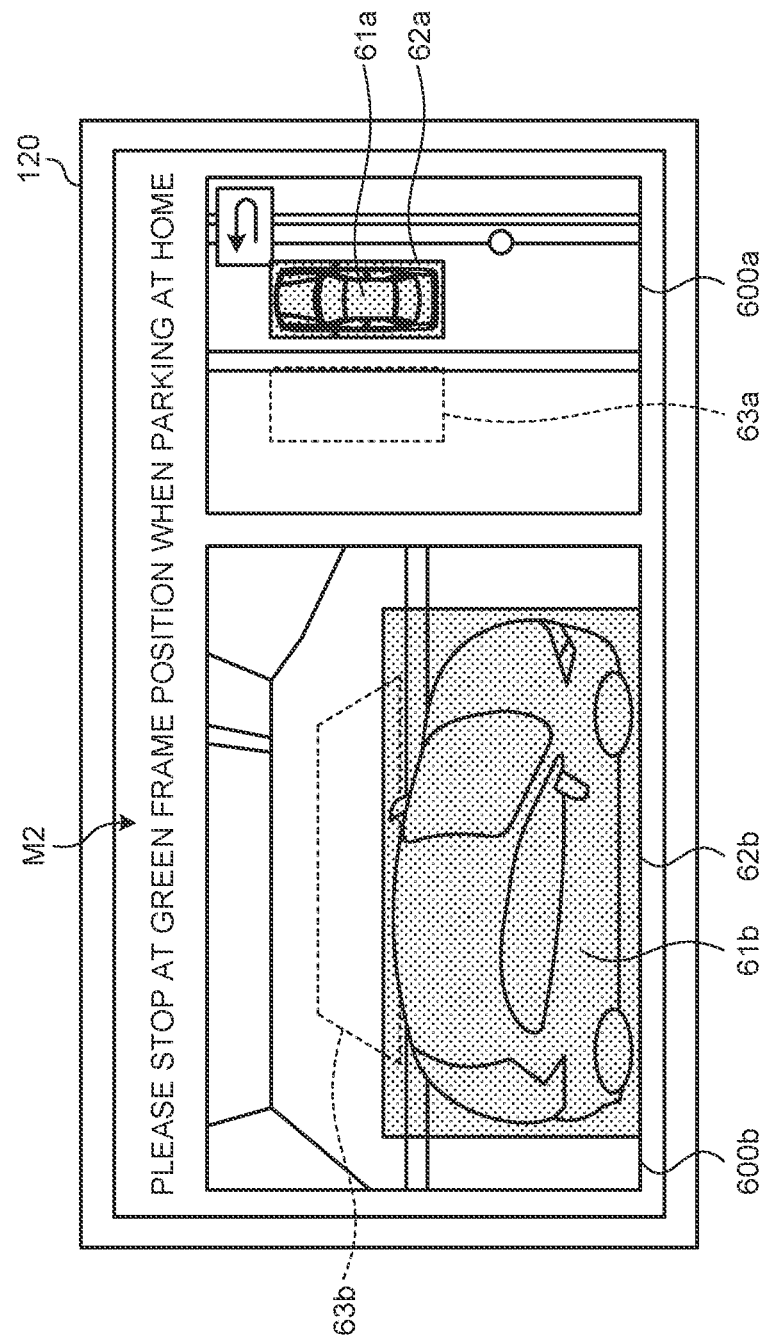

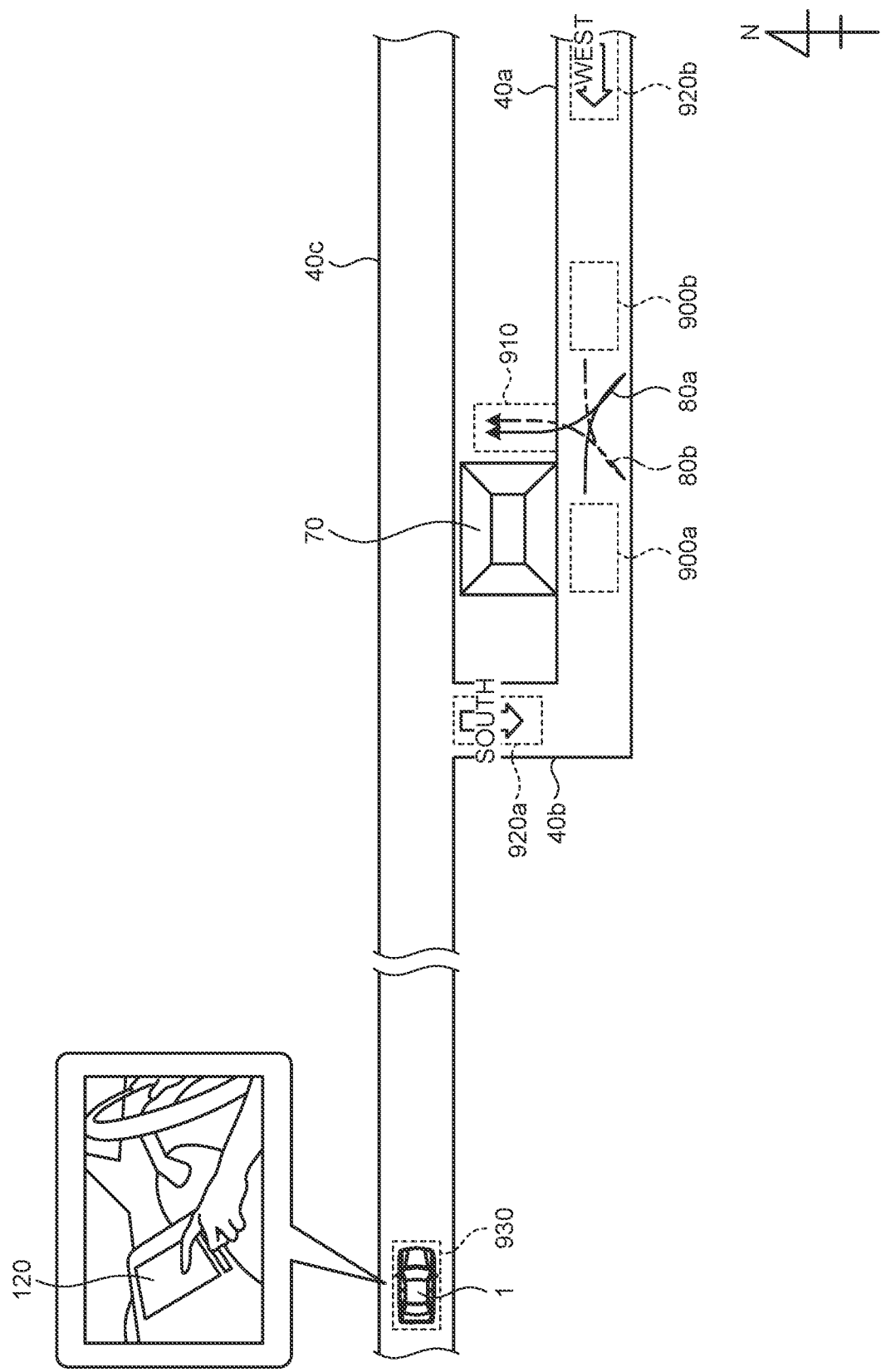

PARKING ASSISTANCE METHOD AND PARKING ASSISTANCE DEVICE

CROSS-REFERENCE TO RELATED APPLICATIONS

This application is based upon and claims the benefit priority from Japanese Patent Application No. 2021-141604, filed Aug. 31, 2021, the entire contents of which are incorporated herein by reference.

FIELD

Embodiments described herein relate generally to a parking assistance method and a parking assistance device.

BACKGROUND

Conventionally, a parking assistance technology that, when a vehicle is parked, moves the vehicle by using automated driving, is known. Such parking assistance technology includes one technology that learns a travel route on the basis of teaching travel by a driver and uses the results of that learning to provide parking assistance. This technology is used, for example, when a user repeatedly parks in a fixed parking position, such as the parking lot at the home or work place of the user.

In a case where the user uses such parking assistance, after the vehicle arrives near the target parking position, a procedure for starting automatic parking is performed after activating the parking assistance function, and thus it takes time to actually start the automatic parking. For example, Japanese Patent No. 6022447 discloses that notification of whether or not it is possible to park in a parking space is issued on the basis of sensor data, and that the driver starts or stops the parking process upon receipt of the notification.

In addition, Japanese Patent Application Laid-open No. 2019-137158 discloses that preparations for parking assistance, such as guidance to the user that automatic parking is possible when a distance between a target parking position and the vehicle is equal to or less than a threshold value, are started in advance. However, in this case, there is a possibility that the user will be annoyed by the start of guidance on parking assistance or the like even when the user does not actually have an intention of parking.

The present disclosure provides a parking assistance method and a parking assistance device that enable preparations for parking assistance to be started smoothly before a vehicle arrives near a target parking position.

SUMMARY

A parking assistance method according to the present disclosure is a method of performing autonomous travel of a vehicle based on a travel route generated using teaching travel by a driver. The parking assistance method includes: acquiring an absolute position and an azimuth in a travel direction of the vehicle; and determining, based on the absolute position and the azimuth in the travel direction, whether or not the vehicle is located oriented with a prescribed azimuth in a prescribed position, which are registered in association with the travel route.

BRIEF DESCRIPTION OF THE DRAWINGS

FIG. 18 is a diagram illustrating an example of a guide image according to a third embodiment; and FIG. 19 is a diagram illustrating an example of guide image display timing according to a first modification example.

DETAILED DESCRIPTION

Hereinafter, embodiments of a parking assistance method and a parking assistance device according to the present disclosure will be described with reference to the drawings.

First Embodiment

Figure 1:
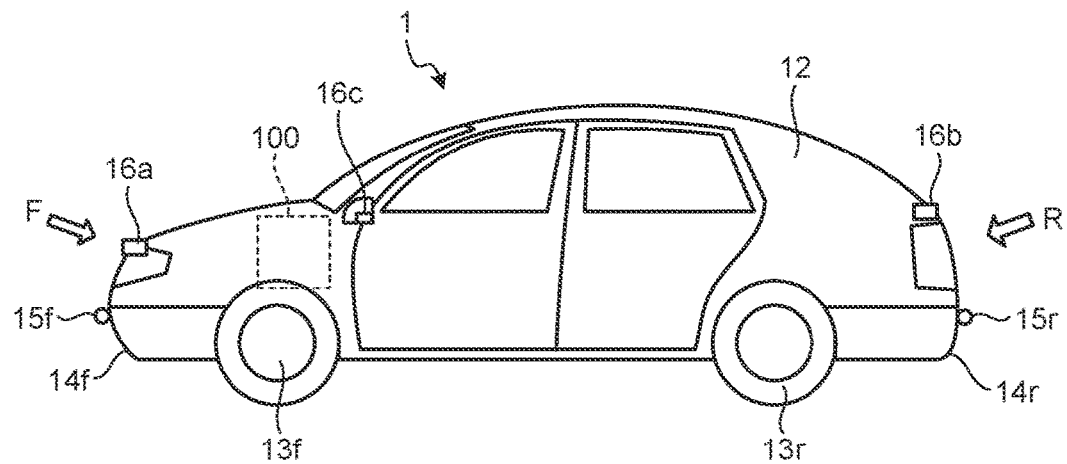
FIG. 1 is a diagram illustrating an example of a vehicle equipped with a parking assistance device according to a first embodiment.

FIG. 1 is a diagram illustrating an example of a vehicle 1 equipped with a parking assistance device 100 according to a first embodiment. As illustrated in FIG. 1, the vehicle 1 is equipped with a vehicle body 12, and two pairs of wheels 13 arranged along a predetermined direction on the vehicle body 12. The two pairs of wheels 13 are equipped with one pair of front tires 13f and one pair of rear tires 13r.

The front tire 13f illustrated in FIG. 1 is an example of a first wheel according to this embodiment. Furthermore, the rear tire 13r is an example of a second wheel according to this embodiment. Note that, although the vehicle 1 illustrated in FIG. 1 is equipped with four wheels 13, the number of wheels 13 is not limited to this quantity. For example, the vehicle 1 could also have two wheels.

The vehicle body 12 is coupled to the wheels 13 and is capable of moving using the wheels 13. In this case, the predetermined direction in which the two pairs of wheels 13 are arranged is the travel direction of the vehicle 1. The vehicle 1 is capable of advancing and retreating through the switching of gears (not illustrated), or the like. Furthermore, the vehicle 1 is also capable of turning left and right through steering.

In addition, the vehicle body 12 has a front end portion F, which is the end on the front tire 13f side, and a rear end portion R, which is the end on the rear tire 13r side. The vehicle body 12 has an approximately rectangular shape in a top view, and the four corner portions of the substantially rectangular shape will sometimes be referred to as ends. Furthermore, although not illustrated in FIG. 1, the vehicle 1 is equipped with a display device, a loudspeaker, an operation unit, an azimuth sensor, a global positioning system (GPS) antenna, and a GPS device.

One pair of bumpers 14 are provided in the vicinity of the lower end of the vehicle body 12, which are the front end portion F and the rear end portion R of the vehicle body 12. Of the one pair of bumpers 14, a front bumper 14f covers a portion of the lateral surface and the whole of the front surface in the vicinity of the lower end portion of the vehicle body 12. Of the one pair of bumpers 14, a rear bumper 14r covers a portion of the lateral surface and the whole of the rear surface in the vicinity of the lower end portion of the vehicle body 12.

Transceivers 15f and 15r, which transmit and receive sound waves such as ultrasonic waves, are arranged at a predetermined end of the vehicle body 12. For example, one or more transceivers 15f are arranged on the front bumper 14f, and one or more transceivers 15r are arranged on the rear bumper 14r. Hereinafter, when there are no particular limitations on the transceivers 15f and 15r, same are simply referred to as the transceivers 15. Furthermore, the quantity and positions of the transceivers 15 are not limited to the example illustrated in FIG. 1. For example, the vehicle 1 may also be equipped with transceivers 15 on the left and right sides.

Although sonar using ultrasonic waves is described as an example of the transceivers 15 in this embodiment, the transceivers 15 may also be radars that transmit and receive electromagnetic waves. Alternatively, the vehicle 1 may also be equipped with both sonar and radar. Further, the transceivers 15 may simply be referred to as sensors.

The transceivers 15 detect obstacles around the vehicle 1 on the basis of the results of transmitting/receiving sound waves or electromagnetic waves. Furthermore, the transceivers 15 measure the distance between the vehicle 1 and obstacles around the vehicle 1 on the basis of the results of transmitting/receiving sound waves or electromagnetic waves.

The vehicle 1 is also equipped with a first imaging device 16a that images the front of the vehicle 1, a second imaging device 16b that images the rear of the vehicle 1, a third imaging device 16c that images the left side of the vehicle 1, and a fourth imaging device that images the right side of the vehicle 1. An illustration of the fourth imaging device is omitted.

Hereinafter, when there is no particular distinction to be made, the first imaging device 16a, the second imaging device 16b, the third imaging device 16c, and the fourth imaging device are referred to simply as the imaging devices 16. The positions and quantity of imaging devices are not limited to or by the example illustrated in FIG. 1. For example, the vehicle 1 may also be equipped with only two devices, namely, the first imaging device 16a and the second imaging device 16b. Alternatively, the vehicle 1 may have further imaging devices in addition to those in the above-mentioned example.

The imaging devices 16 are cameras which are capable of capturing images around the vehicle 1, such as color images, for example. Note that the captured images captured by the imaging devices 16 may be moving images or still images. Furthermore, the imaging devices 16 may be cameras built into the vehicle 1, or drive recorder cameras or the like which are retrofitted to the vehicle 1.

The parking assistance device 100 is also built into the vehicle 1. The parking assistance device 100 is an information processing device that can be built into the vehicle 1, such as, for example, an electronic control unit (ECU) or an on-board unit (OBU) which is provided inside the vehicle 1. Alternatively, the parking assistance device 100 may be an external device that is provided in the vicinity of the dashboard of the vehicle 1. Note that the parking assistance device 100 may also serve as a car navigation device, or the like.

Figure 2:
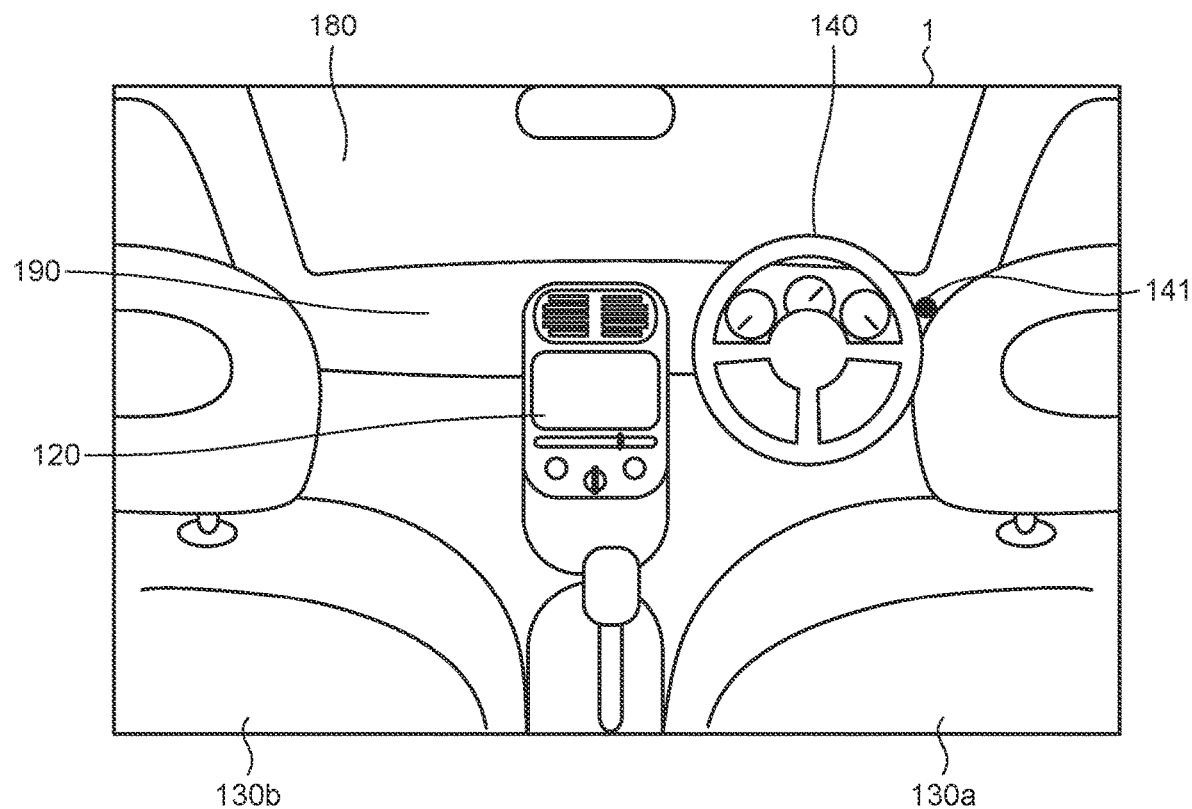
FIG. 2 is a diagram illustrating an example of a configuration in the vicinity of a vehicle driving seat according to the first embodiment.

The configuration in the vicinity of the driving seat of the vehicle 1 according to this embodiment will be described next. FIG. 2 is a diagram illustrating an example of a configuration in the vicinity of a driving seat 130a of the vehicle 1 according to the first embodiment.

As illustrated in FIG. 2, the vehicle 1 is equipped with the driving seat 130a and a passenger seat 130b. Further, in front of the driving seat 130a, there is a windshield 180, a dashboard 190, a steering wheel 140, a display device 120, and an operation button 141.

The display device 120 is a display installed in the dashboard 190 of the vehicle 1. The display device 120 is, by way of an example, located in the center of the dashboard 190, as illustrated in FIG. 2. The display device 120 is, for example, a liquid crystal display, or an organic electroluminescence (EL) display. The display device 120 can also serve as a touch panel. The display device 120 is an example of a display unit according to this embodiment.

Furthermore, the steering wheel 140 is provided in the front surface of the driving seat 130a and can be operated by the driver. The angle of rotation, that is, the steering angle, of the steering wheel 140 is electrically or mechanically linked to the change in direction of the front tires 13f, which are the steered wheels. Note that the steered wheels may be the rear tires 13r, or both the front tires 13f and the rear tires 13r may be the steered wheels.

The operation button 141 is a button that enables operations by the user to be received. Note that, in this embodiment, the user is, for example, the driver of the vehicle 1. The operation button 141 receives an operation from the driver to start parking assistance, for example, by receiving a press from the driver. Note that the position of the operation button 141 is not limited to or by the example illustrated in FIG. 2, and may be provided on the steering wheel 140, for example. The operation button 141 is an example of the operating unit according to this embodiment. Further, when the display device 120 also serves as a touch panel, the display device 120 may also be an example of the operating unit. Furthermore, an operation terminal capable of transmitting a signal to the vehicle 1 from outside the vehicle 1, such as a tablet terminal, a smartphone, a remote controller, or an electronic key (not illustrated), may also be used as an example of the operation unit.

Figure 3:
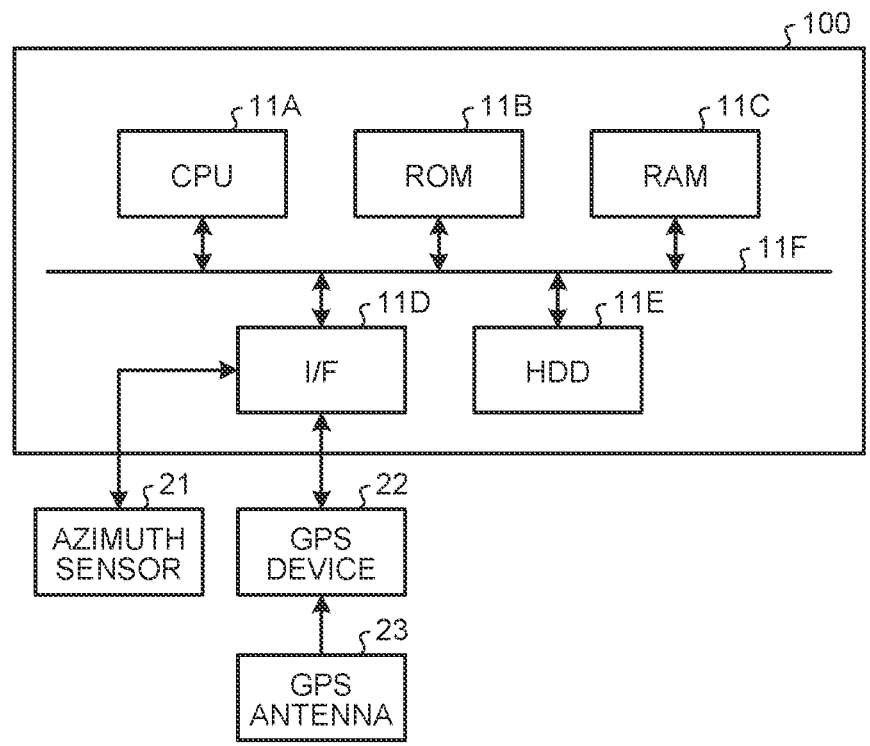
FIG. 3 is a diagram illustrating an example of a hardware configuration of the parking assistance device according to the first embodiment.

Next, the hardware configuration of the parking assistance device 100 will be described. FIG. 3 is a diagram illustrating an example of the hardware configuration of the parking assistance device 100 according to the first embodiment.

As illustrated in FIG. 3, the parking assistance device 100 has a hardware configuration that utilizes an ordinary computer, in which a central processing unit (CPU) 11A, a read-only memory (ROM) 11B, a random-access memory (RAM) 11C, an interface (I/F) 11D, a hard disk drive (HDD) 11E, or the like, are connected to each other via a bus 11F.

The CPU 11A is a computation device that controls the whole ECU. Note that the CPU 11A is an example of a processor in the parking assistance device 100 according to this embodiment, and that another processor or processing circuit may also be provided in place of the CPU 11A.

The ROM 11B stores programs and the like that implement various types of processing by the CPU 11A.

The RAM 11C is, for example, the main storage device of the parking assistance device 100, and stores the data necessary for various types of processing by the CPU 11A.

The I/F 11D is an interface for transmitting and receiving data. The I/F 11D transmits and receives data to and from another device installed in the vehicle 1 such as, for example, the display device 120. In addition, the I/F 11D acquires an azimuth in the travel direction of the vehicle 1 from an azimuth sensor 21.

The azimuth sensor 21 is a sensor that measures the travel direction of the vehicle 1 from, for example, a rotation difference between the left and right wheels 13 of the vehicle 1, geomagnetism, a gas rate gyro, an optical fiber gyro, and the like. Note that a known method can be adopted as the method used to find the azimuth in the travel direction of the vehicle 1, and there are no particular limitations on this method.

In addition, the I/F 11D acquires position information indicating the current position of the vehicle 1 from a GPS device 22. The position information is, for example, latitude and longitude values indicating the absolute position of the vehicle 1.

The GPS device 22 is a device that specifies GPS coordinates representing the position of the vehicle 1 on the basis of a GPS signal received by a GPS antenna 23. Further, the GPS antenna 23 is an antenna capable of receiving a GPS signal.

In addition, the I/F 110 may transmit and receive information to and from another ECU mounted in the vehicle it via a controller area network (CAN) or the like in the vehicle 1, or may communicate with an information processing device outside the vehicle 1 via a network such as the Internet.

In FIG. 3, the azimuth sensor 21, the GPS device 22, and the GPS antenna 23 are illustrated as not included in the parking assistance device 100, but some or all of them may be included in the parking assistance device 100. Further, in FIGS. 1 to 3, the display device 120 is illustrated as a device that is separate from the parking assistance device 100, but the display device 120 could also be incorporated in the parking assistance device 100.

The parking assistance device 100 according to this embodiment learns the travel route on the basis of the teaching travel by the driver, and performs parking assistance by using the learning result. In other words, the parking assistance method executed by the parking assistance device 100 is a method of performing autonomous travel of the vehicle 1 on the basis of a travel route generated by the teaching travel by the driver. Such a parking assistance method is effective for reducing the labor of parking of the driver, for example, when parking is repeatedly performed at a determined parking position such as a garage at the home of the driver, a contracted parking position of an apartment building, or a prescribed parking position in a parking lot such as a work place. Such parking assistance is called home zone parking.

Figure 4:
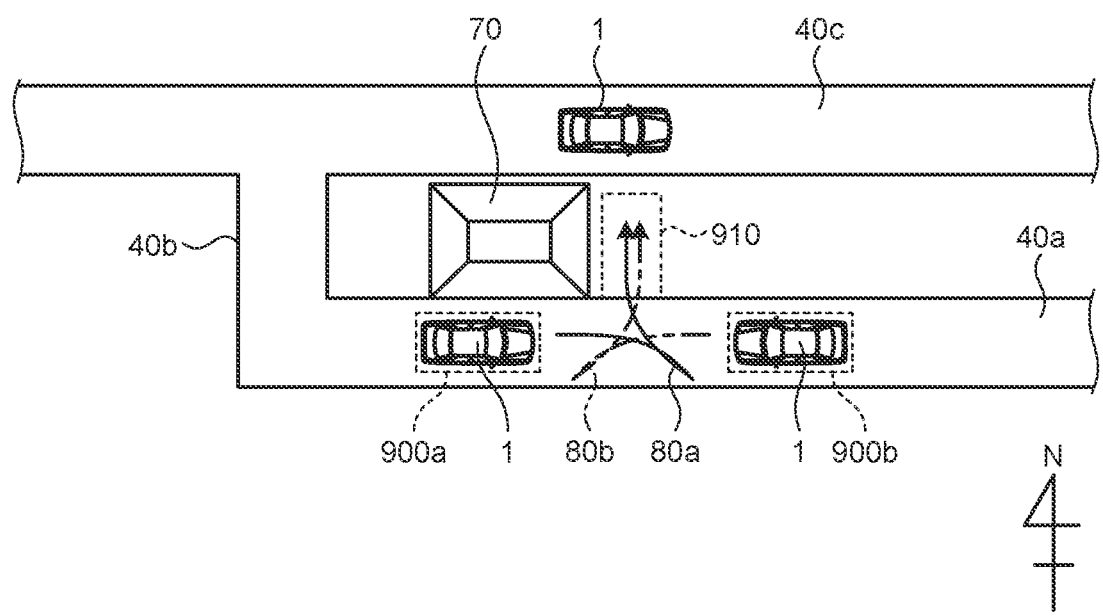
FIG. 4 is a diagram illustrating an example of an environment to which home zone parking according to the first embodiment is applied.

FIG. 4 is a diagram illustrating an example of an environment to which home zone parking according to the first embodiment is applied. In the example illustrated in FIG. 4, a parking space 910 located near a home 70 of the driver of the vehicle 1 is the parking position of the vehicle 1. In FIG. 4, azimuths are illustrated with up as north, down as south, right as east, and left as west.

The parking space 910 faces a road 40a. Further, as another road connected to the road 40a, there is a road 40b. There is also a road 40c near the parking space 910, but the road 40c is not connected to the parking space 910.

In the example illustrated in FIG. 4, travel routes on which the vehicle 1 can be parked in the parking space 910 include a first travel route 80a starting from the west side of the parking space 910 and a second travel route 80b starting from the east side of the parking space 910. The first travel route 80a and the second travel route 80b are travel routes recorded by the parking assistance device 100 on the basis of the teaching travel by the user. Hereinafter, when the first travel route 80a and the second travel route 80b are referred to collectively, same are simply referred to as travel routes 80.

The first travel route 80a is a route on which the vehicle 1 travels from a first start position 900a on the road 40a to the parking space 910. Further, the second travel route 80b is a route on which the vehicle 1 travels from a second start position 900b on the road 40a to the parking space 910. Hereinafter, when the first start position 900a and the second start position 900b are referred to collectively, same are simply referred to as start positions 900. Note that the number and shape of the travel routes 80 illustrated in FIG. 4 are examples, and the present invention is not limited thereto.

In this embodiment, details of the functions of the parking assistance device 100 will be specifically described using the environment illustrated in FIG. 4 as an example.

Figure 5:
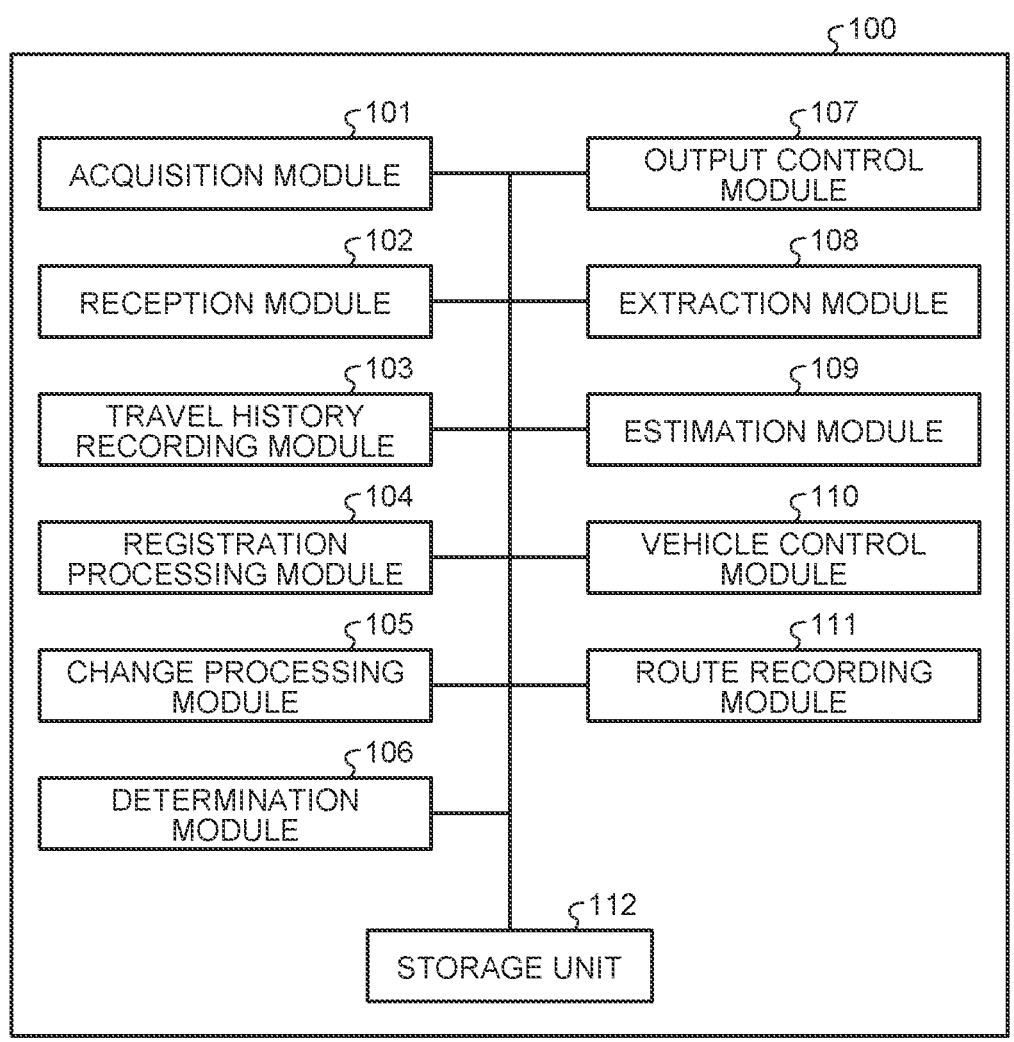
FIG. 5 is a block diagram illustrating an example of the functions of the parking assistance device according to the first embodiment.

FIG. 5 is a block diagram illustrating an example of the functions of the parking assistance device 100 according to the first embodiment.

As illustrated in FIG. 5, the parking assistance device 100 according to this embodiment is equipped with an acquisition module 101, a reception module 102, a travel history recording module 103, a registration processing module 104, a change processing module 105, a determination module 106, an output control module 107, an extraction module 108, an estimation module 109, a vehicle control module 110, a route recording module 111, and a storage unit 112.

The storage unit 112 is configured from the ROM 11B, the RAM 11C, or the HDD 11E, for example. Note that, in FIG. 5, although one storage unit 112 is disclosed as being included in the parking assistance device 100, a plurality of storage media may also function as the storage unit 112.

The storage unit 112 stores programs and data used in the various types of processing executed by the parking assistance device 100. For example, the program executed by the parking assistance device 100 according to this embodiment has a module configuration that includes the above-described functional units (the acquisition module 101, the reception module 102, the travel history recording module 103, the registration processing module 104, the change processing module 105, the determination module 106, the output control module 107, the extraction module 108, the estimation module 109, the vehicle control module 110, the route recording module 111), and as actual hardware, the CPU 11A reads the program from the storage unit 112 and executes the program, and thus the respective units are loaded onto the RAM 11C, and the acquisition module 101, the reception module 102, the travel history recording module 103, the registration processing module 104, the change processing module 105, the determination module 106, the output control module 107, the extraction module 108, the estimation module 109, the vehicle control module 110, and the route recording module 111 are generated on the RAM 11C. Note that the processing realized by each functional unit of the parking assistance device 100 is also referred to as a step.

The program executed by the parking assistance device 100 according to this embodiment is provided as a file in an installable format or an executable format, and is recorded on a computer-readable recording medium such as a CD-ROM, flexible disk (FD), CD-R, or DVD (Digital Versatile Disk).

Furthermore, the program executed by the parking assistance device 100 according to this embodiment may be configured to be stored on a computer connected to a network such as the internee or to be provided by being downloaded over the network. Furthermore, the program executed by the parking assistance device 100 according to this embodiment may also be configured so as to be provided or distributed via a network such as the Internet. In addition, the program executed by the parking assistance device 100 according to this embodiment could also be configured to be provided pre-installed on the ROM 11B, or the like.

The acquisition module 101 acquires the absolute position and the azimuth in the travel direction of the vehicle 1. The acquisition processing is an example of a first acquisition step in this embodiment. More specifically, the acquisition module 101 acquires the absolute position of the vehicle 1 from the GPS device 22 via the I/F 11D. In addition, the acquisition module 101 acquires the azimuth in the travel direction of the vehicle 1 from the azimuth sensor 21 via the I/F 11D.

In addition, the acquisition module 101 acquires an image obtained by imaging the periphery of the vehicle 1. Note that, since the captured image is an image obtained by imaging the periphery of the vehicle 1, the captured image is referred to as a peripheral image in this embodiment. The acquisition processing is an example of a second acquisition step in this embodiment. Furthermore, in the second acquisition step. The acquisition module 101 may further acquire information regarding the distance between the vehicle and objects around the vehicle 1 during the teaching travel.

The reception module 102 receives various operations from the user. For example, when the operation button 141 is pressed in a state where the travel route 80 has been registered, the reception module 102 receives an operation by the user to start parking assistance. The reception processing is an example of a first reception step in this embodiment.

In addition, the reception module 102 receives a user operation to register a calling point and a prescribed azimuth via the display device 120 and the I/F 11D, for example. The calling point and the prescribed azimuth will be described subsequently. In addition, the reception module 102 receives a user operation to correct the calling point and the prescribed azimuth. The reception processing is an example of a second reception step in this embodiment.

In addition, for example, when the operation button 141 is pressed, the reception module 102 receives an operation by the user to start and end recording of the teaching travel. In this embodiment, in a case where a start operation reception step, which is processing to receive an operation to start recording of the teaching travel, and an end operation reception step which is processing to receive an operation to end recording of the teaching travel are collectively referred to as start-end operation reception steps.

Note that there are no particular limitations on the means with which the reception module 102 receives a user operation. For example, in a case where the display device 120 is a touch panel, when an image button on the touch panel is pressed, the reception module 102 may receive an operation to start and end recording of teaching travel or to start parking assistance.

The travel history recording module 103 records the absolute position and the azimuth in the travel direction of the vehicle 1, as acquired chronologically by the acquisition module 101 in the storage unit 112 as a travel history of the vehicle 1. More specifically, when the vehicle 1 executes parking assistance, the travel history recording module 103 records, in association with the travel route 80 used in the parking assistance, a chronological history of the absolute position of the vehicle 1 within a prescribed distance from the start position 900 of the travel route 80 used in the parking assistance, and the azimuth in the travel direction of the vehicle 1 in each position.

Figure 6:
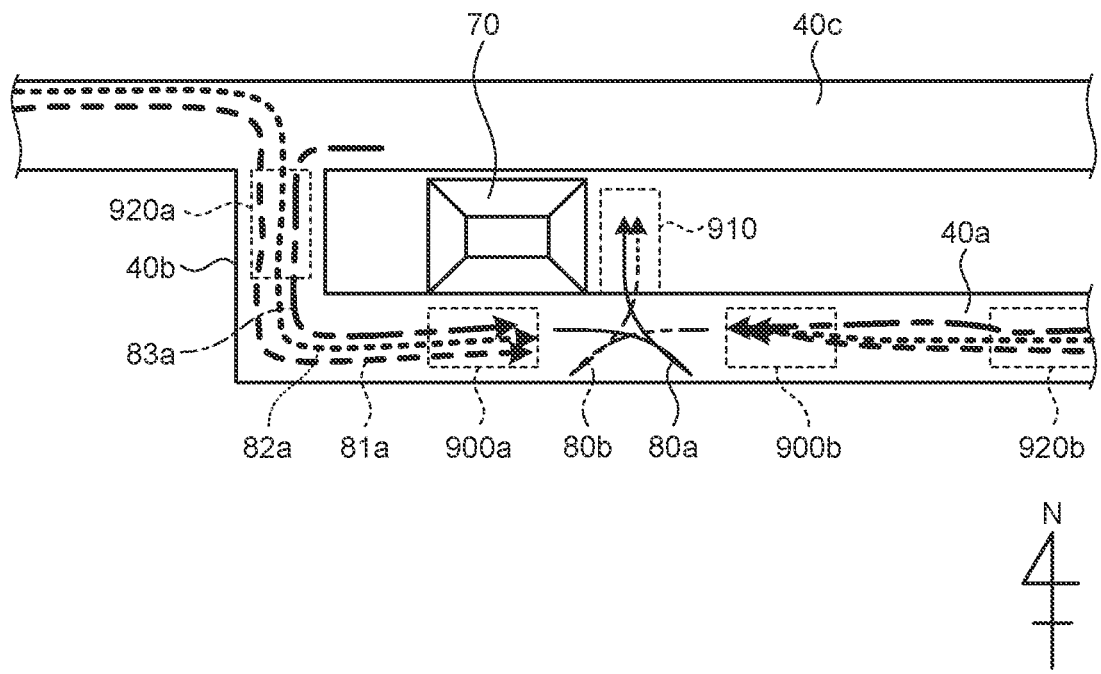
FIG. 6 is a diagram illustrating a simulated example of a plurality of travel histories according to the first embodiment.

FIG. 6 is a diagram illustrating a simulated example of a plurality of travel histories according to the first embodiment. In the example illustrated in FIG. 6, the user manually travels to the first start position 900a through routes 81a, 82a, and 83a before using parking assistance along the first travel route 80a. The travel history recording module 103 records, as a travel history, the routes 81a, 82a, and 83a and the direction of the vehicle 1 on the routes 81a, 82a, and 83a, in association with the first travel route 80a. Further, the user manually travels to the second start position 900b through routes 81b, 82b, and 83b before using the parking assistance along the second travel route 80b. The travel history recording module 103 records, as a travel history, the routes 81b, 82b, and 83b and the direction of the vehicle 1 on the routes 81b, 82b, and 83b, in association with the second travel route 80b.

In addition, when the vehicle 1 does not execute parking assistance, the travel history recording module 103 deletes, without saving the recording, the recording of the absolute position and the azimuth in the travel direction of the vehicle 1.

Returning to FIG. 5, the registration processing module 104 specifies a calling point and a prescribed azimuth at the calling point on the basis of a plurality of past travel histories of the vehicle 1, and registers, in association with the travel route 80, the specified calling point and the prescribed azimuth at the calling point. The registration processing is an example of a first registration step.

The calling point is a position at which the output control module 107 (described subsequently) outputs a notification to the user prompting an operation to start parking assistance. The calling point is located within the range of the prescribed distance from the start position 900 of the travel route 80, and is a position where the user is likely to park the vehicle 1 in the parking space 910 after the vehicle 1 passes the position. The prescribed distance is, for example, about 100 to 200 m, but is not limited thereto. The calling point is an example of a prescribed position according to this embodiment.

The prescribed azimuth is an azimuth in the travel direction of the vehicle 1 at the calling point.

More specifically, the registration processing module 104 specifies, as a calling point, a position within the range of the prescribed distance from the start position of the travel route 80 among the positions through which a plurality of past travel histories of the vehicle 1 have commonly passed before execution of autonomous travel.

In FIG. 6, in the past travel history, a first calling point 920a is exemplified as a position where vehicle 1 commonly passes before reaching the first start position 900a of the first travel route 80a and which is about 100 to 200 m away from the first start position 900a. In addition, in the past travel history, the vehicle 1 faces the south at the first calling point 920a.

Figure 7:
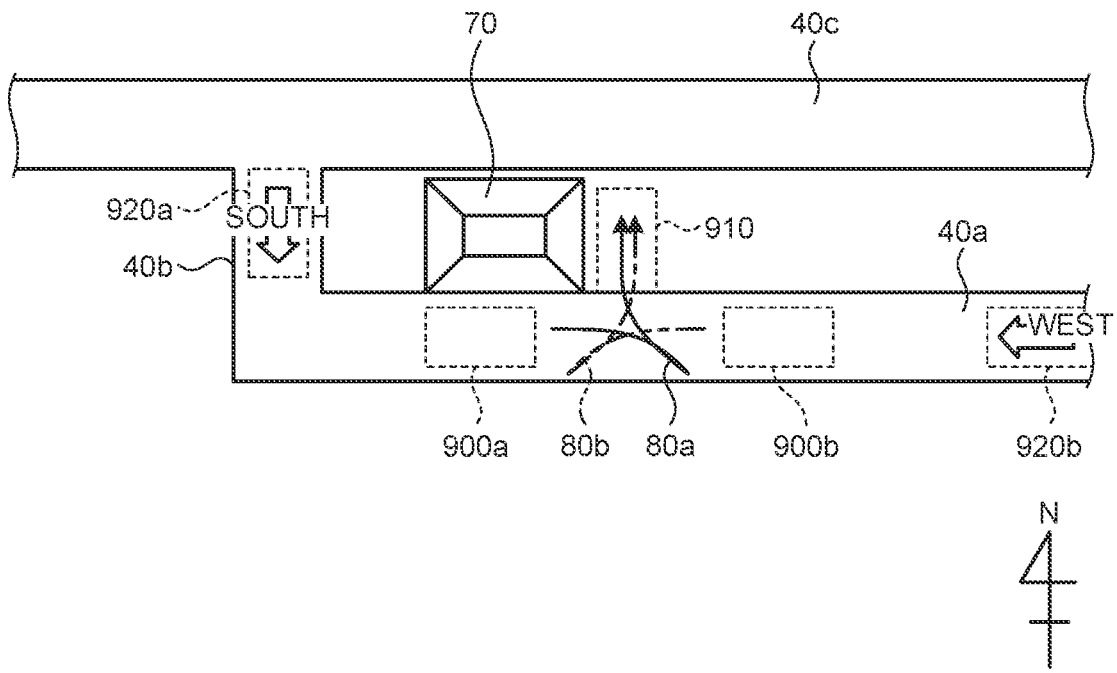
FIG. 7 is a diagram illustrating an example of a calling point and a prescribed azimuth according to the first embodiment.

FIG. 7 is a diagram illustrating an example of a calling point 920 and a prescribed azimuth according to the first embodiment. As illustrated in FIG. 7, the registration processing module 104 registers the absolute position of the first calling point 920a and the azimuth "south" in the travel direction of the vehicle 1, in the storage unit 112 in association with the first travel route 80a. That is, when the vehicle 1 is located at the first calling point 920a and the travel direction of the vehicle 1 is oriented toward the south, the vehicle 1 satisfies a condition for notification by the output control module 107 (described subsequently). Note that although, in this embodiment, the azimuth in the travel direction is represented by north, south, east, and west for the sake of simplifying the description, in reality, the registration processing module 104 registers the azimuth in the travel direction using a numerical value such as 360 degrees in a clockwise direction in which north represents 0 degrees.

In addition, in FIG. 6, a second calling point 920b is exemplified as a position where the vehicle 1 commonly passes before reaching the second start position 900b of the second travel route 80b in the past travel history and which is about 100 to 200 m spaced apart from the second start position 900b. In this case, as illustrated in FIG. 7, the registration processing module 104 registers, in the storage unit 112, the absolute position of the second calling point 920b and the azimuth "west" in the travel direction of the vehicle 1 at the second calling point 920b, in association with the second travel route 80b. When there is no particular distinction to be made, the first calling point 920a and the second calling point 920b are referred to later simply as the calling points 920.

Figures 8, 9:
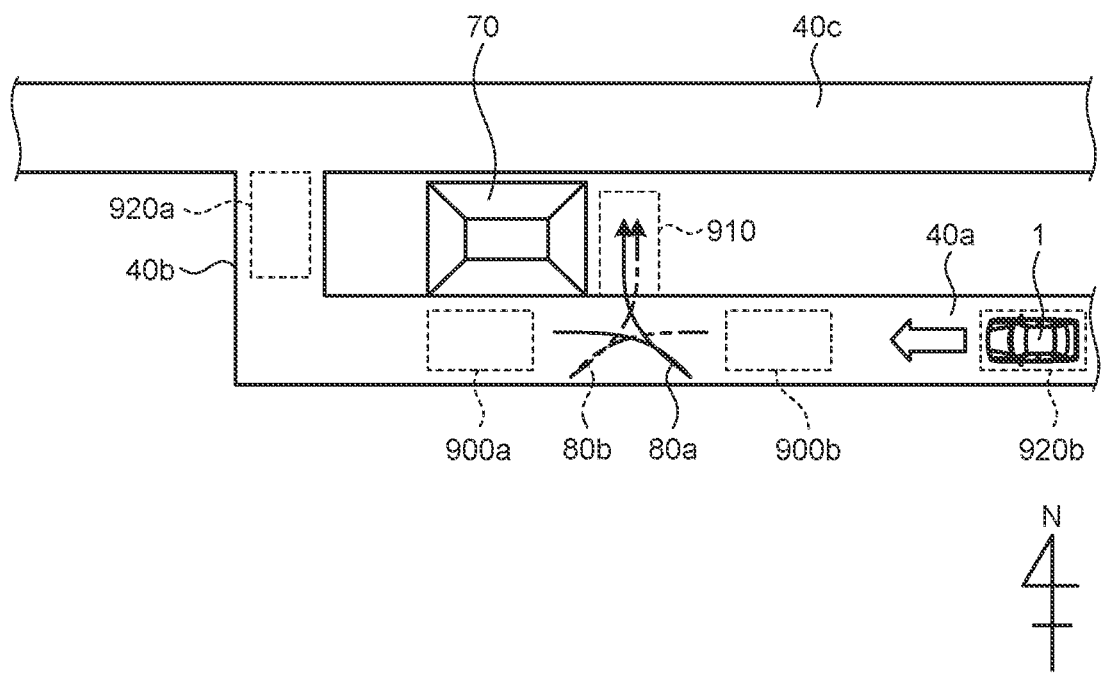
FIG. 8 is a diagram illustrating an example of a registration format of a calling point and a prescribed azimuth according to the first embodiment.
FIG. 9 is a diagram illustrating an example of a state in which a vehicle is located at a second calling point according to the first embodiment.

FIG. 8 is a diagram illustrating an example of a registration format of a calling point 920 and a prescribed azimuth according to the first embodiment. As illustrated in FIG. 8, the latitude and longitude representing the absolute position of the calling point 920, an azimuth representing a prescribed azimuth, and a travel route 80 are registered in association with each other. Note that, although one calling point is registered for one travel route in FIG. 8, a plurality of calling points may be registered for one travel route.

Returning to FIG. 5, the change processing module 105 changes the registered calling point 920 and the prescribed azimuth on the basis of an operation by the user to correct the calling point 920 and the prescribed azimuth. The registration processing is an example of a change step. For example, when the calling point 920 and the prescribed azimuth are displayed on the display device 120 by the output control module 107 (described subsequently), the user is able to perform, using a touch operation or the like, an operation to correct the calling point 920 and the prescribed azimuth.

The determination module 106 determines, on the basis of the absolute position of the vehicle 1 and the azimuth in the travel direction, whether the vehicle 1 is located oriented with a prescribed azimuth at the calling point 920 registered in association with the travel route 80. The determination processing is an example of a determination step.

More specifically, when the difference between the acquired absolute position of the vehicle 1 and the calling point 920 is within a first prescribed range and the difference between the acquired azimuth in the travel direction of the vehicle 1 and the prescribed azimuth is within a second prescribed range, the determination module 106 determines that the vehicle 1 is located oriented with a prescribed azimuth at the calling point 920.

For example, the determination module 106 compares the acquired latitude and longitude of the absolute position of the vehicle 1 with the latitude and longitude of the calling point 920 registered in the storage unit 112. There are not particular limitations on the first prescribed range, but may be, for example, a range on the order of several meters. In addition, the determination module 106 compares the acquired azimuth in the travel direction of the vehicle 1 with the prescribed azimuth registered in the storage unit 112. There are no particular limitations on the second prescribed range, but same may be allowed up to an angle difference of several degrees, for example. The first prescribed range and the second prescribed range may also be changeable by the user.

FIG. 9 is a diagram illustrating an example of a state in which the vehicle 1 is located at the second calling point 920b according to the first embodiment. In the example illustrated in FIG. 9, the absolute position of the vehicle 1 is the same position as the second calling point 920b among the registered first calling point 920a and the second calling point 920b. In addition, the azimuth in the travel direction of the vehicle 1 is the same as the predetermined azimuth "west" associated with the second calling point 920b. In this case, the determination module 106 determines that the vehicle 1 is located at the second calling point 920b and is oriented with the prescribed azimuth.

Figure 10:
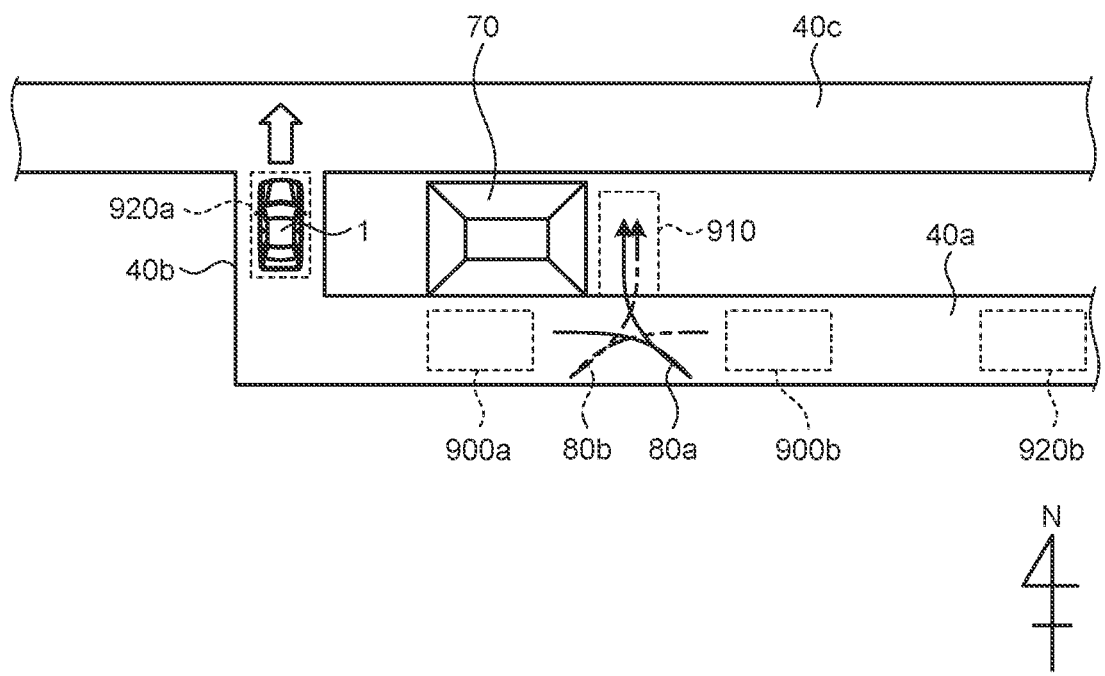
FIG. 10 is a diagram illustrating an example of a state in which a vehicle is located at a first calling point according to the first embodiment.

FIG. 10 is a diagram illustrating an example of a state in which the vehicle 1 is located at the first calling point 920a according to the first embodiment. In the example illustrated in FIG. 10, the absolute position of the vehicle 1 is the same position as the first calling point 920a among the registered first calling point 920a and the second calling point 920b. However, the azimuth in the travel direction of the vehicle 1 is "north", which is different from the predetermined azimuth "south" associated with the first calling point 920a. In this case, the determination module 106 determines that although the vehicle 1 is located at the first calling point 920a, same is not oriented with the prescribed azimuth. Thus, because the determination module 106 makes the determination on the basis of not only the position but also the azimuth in the travel direction of the vehicle 1, it is possible to discriminate between a case where the vehicle 1 leaves the parking space 910 and a case where the vehicle 1 returns from the destination and heads for the parking space 910.

Returning to FIG. 5, when the determination module 106 has determined that the vehicle 1 is located oriented with the prescribed azimuth at the calling point 920, the output control module 107 outputs a notification to the user prompting an operation to start the parking assistance operation. The output processing is an example of a first output step.

Figure 11:
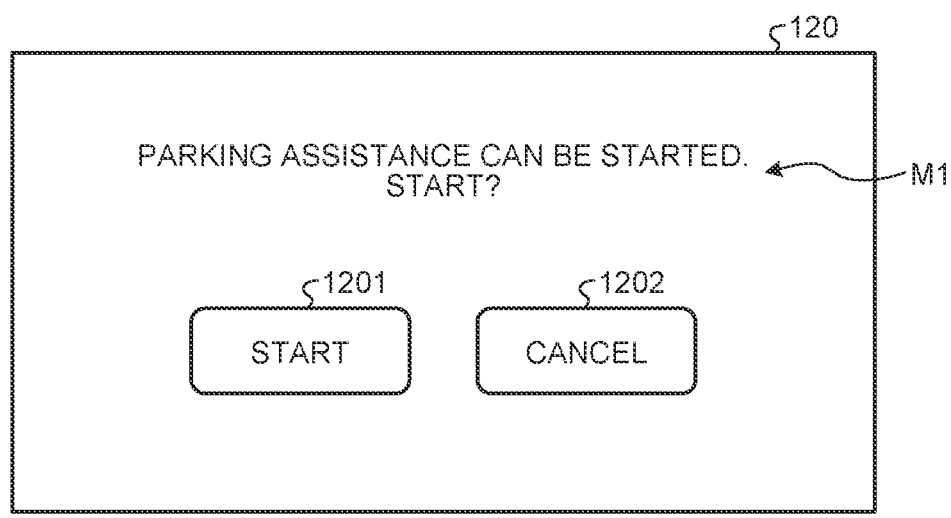
FIG. 11 is a diagram illustrating an example of a notification for prompting an operation to start parking assistance according to the first embodiment.

FIG. 11 is a diagram illustrating an example of a notification prompting an operation to start parking assistance according to the first embodiment. In the example illustrated in FIG. 11, the output control module 107 causes the display device 120 to display a message M1 as a notification prompting an operation to start parking assistance. The content of the message M1 includes the fact that parking assistance can be started, such as, for example, "Parking assistance can be started. Start?", and prompts the user to perform an operation.

Furthermore, the output control module 107 may cause the display device 120 to display a start button 1201 and a cancel button 1202. When the user presses the start button 1201, the reception module 102 receives an operation by the user to start parking assistance. Further, when the user presses the cancel button 1202, the reception module 102 receives an operation by the user to cancel parking assistance.

Note that the notification method is not limited to a screen display, and may be a notification using voice, or the like.

In addition, the output control module 107 displays various operation screens on the display device 120. For example, the output control module 107 causes the display device 120 to display the calling point 920 and the prescribed azimuth as specified by the registration processing module 104.

In addition, the output control module 107 causes the display device 120 to display a guide image representing the start position 900 of the travel route 80 at the start of parking assistance. The user grasps the start position 900 of the travel route 80 from the guide image displayed on the display device 120. There are no particular limitations on the display mode of the guide image, but may be, for example, an image obtained by superimposing an image representing the start position 900 of the travel route 80 on an overhead image that includes the vehicle 1 and the periphery of the vehicle 1.

Returning to FIG. 5, the extraction module 108 extracts feature points from the peripheral image. There are no particular limitations on the technique used by the extraction module 108 to extract feature points, and any known technique may be applied. For example, the extraction module 108 extracts feature points using a technique such as FAST (Features from Accelerated Segment Test) or ORB (Oriented FAST and Rotated BRIEF). Furthermore, at the time of learning the travel route 80, the extraction module 108 may preferentially record a feature point that satisfies a prescribed condition among the extracted feature points. For example, feature points extracted from among a plurality of peripheral images that are chronologically contiguous and for which the distance the vehicle 1 has moved during imaging is longer may be preferentially selected as feature points.

When the vehicle 1 travels autonomously on the basis of the travel route 80 due to the vehicle control module 110 (described subsequently), the estimation module 109 estimates the position and direction of the vehicle 1 on the basis of the peripheral images. The determination processing is an example of an estimation step.

For example, the estimation module 109 estimates the position of the vehicle 1 by comparing the feature points of the peripheral images captured during the teaching travel with the feature points of the current peripheral images. The position estimated by the estimation module 109 may be any relative positional relationship with the start position 900 of the registered travel route 80 and may not be the absolute position. Note that the technique for estimating the position and the direction of the vehicle 1 by the estimation module 109 is not limited to this example.

Note that the feature points of the peripheral images captured during teaching travel are an example of the data generated from the peripheral images. The feature points of the peripheral images captured during teaching travel are saved in the storage unit 112 as a feature point map by the route recording module 111 (described subsequently), for example. Specifically, the estimation module 109 reads the feature-point map from the storage unit 112 and compares the feature-point map with the feature points of the current peripheral image, thereby estimating the position of the vehicle 1.

The vehicle control module 110 moves the vehicle 1 to the parking space 910 by automated driving on the basis of the travel route 80. The vehicle control module 110 causes the vehicle 1 to travel autonomously along the registered travel route 80 by controlling the steering, braking, and acceleration/deceleration of the vehicle 1. Such a travel control technique is also called regenerating the travel route 80. The autonomous travel processing by the vehicle control module 110 is an example of a travel control step.

The route recording module 111 records the travel route 80 of the vehicle 1 in the teaching travel. The route recording module 111 estimates the position of the vehicle 1 during the teaching travel on the basis of, for example, changes in feature points extracted from a plurality of peripheral images and vehicle information of the vehicle 1, and specifies the travel route 80 from chronological changes in the position.

More specifically, the route recording module 111 specifies a change in the position of the vehicle 1 on the basis of chronological changes in the feature points extracted from a plurality of peripheral images captured during teaching travel. Furthermore, the route recording module 111 may correct the position of the vehicle 1 specified from the feature point on the basis of the acquired vehicle information.

In this embodiment, the travel route 80 for autonomous travel and the speed, steering angle, braking operation of the vehicle 1 traveling on the travel route 80, and information in which feature points extracted from a plurality of peripheral images captured together with the movement of the vehicle 1 during teaching travel are associated chronologically is referred to as travel route information. The route recording module 111 saves the travel route information in the storage unit 112. The travel route information is used by the vehicle control module 110 during autonomous travel (described subsequently). Note that the technique for recording the travel route 80 and the definition of the travel route information are not limited to this example.

In addition, the route recording module 111 defines the environment around the vehicle 1 as a map on the basis of the feature points extracted from the peripheral images captured during the teaching travel, and stores the map in the storage unit 112. Note that the recording processing of the travel route 80 based on the teaching travel may be referred to as learning processing.

Next, the flow of travel history recording processing executed by the parking assistance device 100 according to this embodiment configured as described above will be described.

Figure 12:
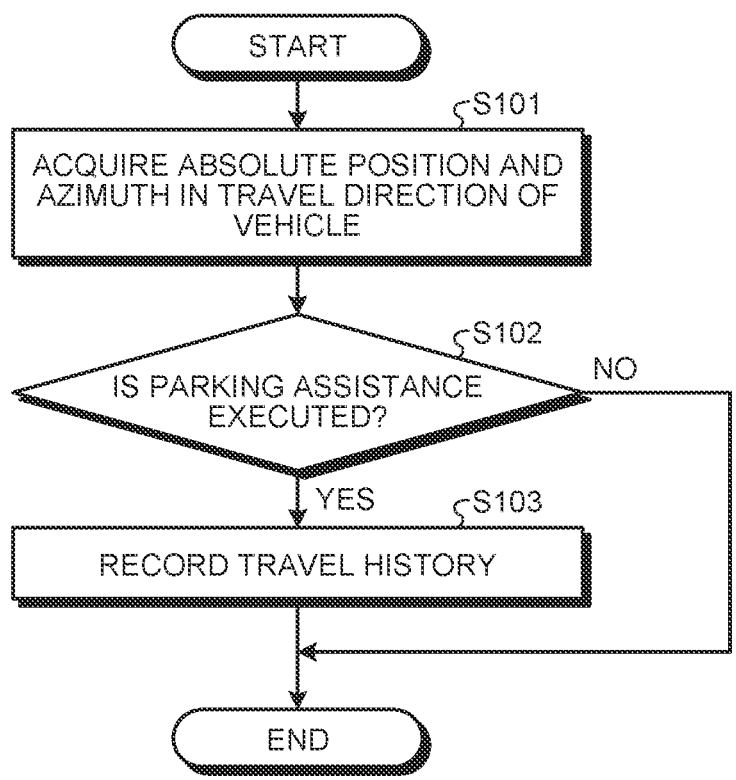
FIG. 12 is a flowchart illustrating an example of the flow of travel history recording processing executed by the parking assistance device according to the first embodiment.

FIG. 12 as a flowchart illustrating an example of a flow of travel history recording processing executed by the parking assistance device according to the first embodiment. As a premise of the processing, it is assumed that the travel route 80 based on the teaching travel has already been registered.

First, the acquisition module 101 acquires the absolute position of the vehicle 1 and the azimuth in the travel direction (S101).

Next, the travel history recording module 103 determines whether parking assistance by the vehicle control module 110 has been executed, and when parking assistance has been executed (S102: "Yes"), records the absolute position and the azimuth in the travel direction of the vehicle 1, which are acquired chronologically by the acquisition module 101 in the storage unit 112 as the travel history of the vehicle 1 (S103).

In addition, when parking assistance is not executed (S102: "No"), the travel history recording module 103 does not record the absolute position and the azimuth in the travel direction of the vehicle 1, which are acquired chronologically by the acquisition module 101. Here, the processing of this flowchart is complete.

Next, the flow of processing to register calling points which is executed by the parking assistance device 100 according to this embodiment will be described.

Figure 13:
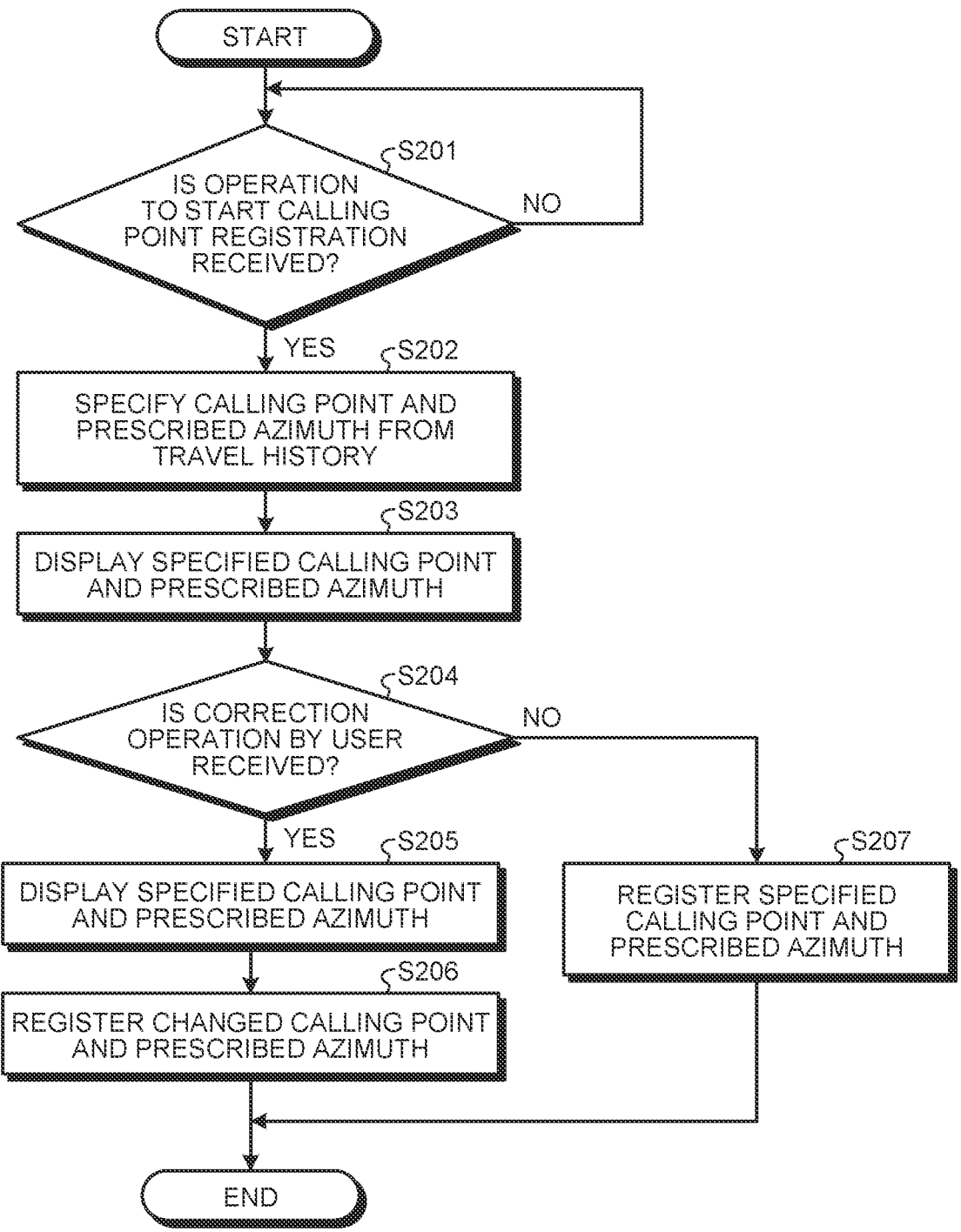
FIG. 13 is a flowchart illustrating an example of the flow of calling point registration processing executed by the parking assistance device according to the first embodiment.

FIG. 13 is a flowchart illustrating an example of the flow of processing to register calling points which is executed by the parking assistance device 100 according to the first embodiment.

First, the reception module 102 determines whether or not an operation to start calling point registration by the user has been received (S201). When an operation to start calling point registration by the user has not been received (S201: "No"), the reception module 102 repeats the processing of S201 and stands by.

When the reception module 102 receives an operation to start calling point registration by the user (S201: "Yes"), the registration processing module 104 specifies the calling point 920 and the prescribed azimuth from the plurality of past travel histories of the vehicle 1 which are stored in the storage unit 112 (S202).

The output control module 107 then superimposes the calling point 920 and the prescribed azimuth specified by the registration processing module 104 on a map image, for example, and causes the display device 120 to display same (S203).

Further, when the reception module 102 receives an operation to correct the calling point 920 or the prescribed azimuth by the user (S204: "Yes"), the registration processing module 104 changes the calling point 920 and the prescribed azimuth according to the user operation (205), and registers the changed calling point 920 and the prescribed azimuth in the storage unit 112 (S206).

In addition, when the reception module 102 has not received an operation to correct the calling point 920 and the prescribed azimuth by the user (S204: "No"), the registration processing module 104 registers the calling point 920 and the prescribed azimuth specified in S202 in the storage unit 112 (S207). Here, the processing of this flowchart is complete.

Note that, in FIG. 13, although the correction operation by the user is received immediately after specifying the calling point 920 and the prescribed azimuth, the timing for the correction operation by the user is not limited to such the timing. For example, the user may correct the calling point 920 and the prescribed azimuth after the start of management according to the registered calling point 920 and the prescribed azimuth.

Next, the flow of processing for notification that parking assistance can be started and for parking assistance, which is executed by the parking assistance device 100 according to this embodiment, will be described.

Figure 14:
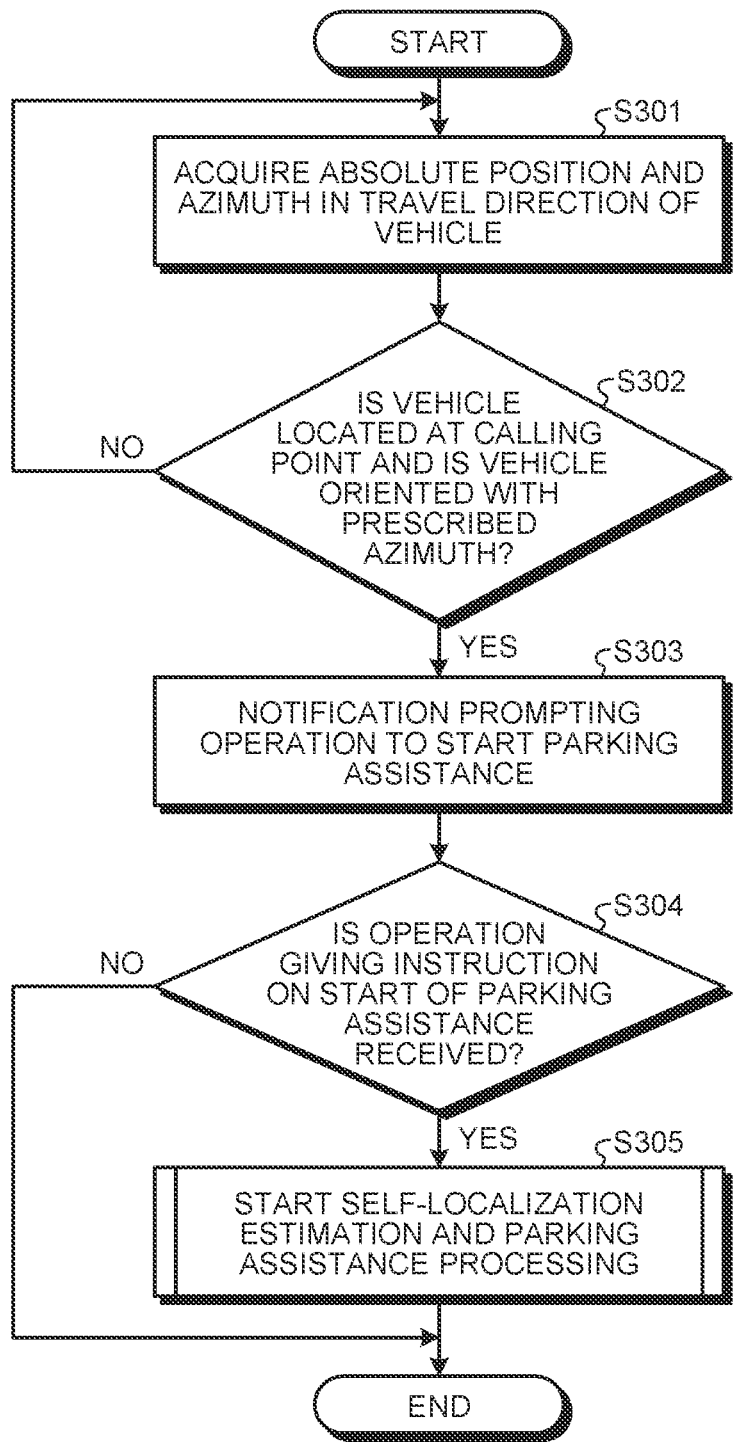
FIG. 14 is a flowchart illustrating an example of the flow of processing to issue notification that parking assistance can be started and to perform parking assistance, which is executed by the parking assistance device according to the first embodiment.

FIG. 14 is a flowchart illustrating an example of the flow of processing for notification that parking assistance can be started and for parking assistance, which is executed by the parking assistance device 100 according to the first embodiment.

First, the acquisition module 101 acquires the absolute position of the vehicle 1 and the azimuth in the travel direction (S301).

The determination module 106 then determines whether or not the vehicle 1 is located at the calling point 920 and the vehicle 1 is oriented with a prescribed azimuth on the basis of the acquired absolute position and the azimuth in the travel direction of the vehicle 1, and the calling point 920 and the prescribed azimuth that are registered in the storage unit 112 (S302). When a plurality of calling points 920 and the azimuth in the travel direction are registered, the determination module 106 compares each of the registered plurality of calling points 920 and the azimuth in the travel direction with the acquired absolute position and the azimuth in the travel direction of the vehicle 1.

When the determination module 106 has determined that the vehicle 1 is not located at the calling point 920 or that the vehicle 1 is not oriented with the prescribed azimuth (S302: "No"), the processing returns to S301.

When the determination module 106 has determined that the vehicle 1 is located at the calling point 920 and that the vehicle 1 is oriented with the prescribed azimuth (S302: "Yes"), the output control module 107 outputs a notification prompting an operation to start parking assistance (S303). Through the notification, the user is able to grasp that the parking assistance device 100 can start parking assistance.

Further, when the start button 1201 displayed on the display device 120 is pressed by the user, for example, the reception module 102 receives an operation giving an instruction on the start of parking assistance (S304: "Yes"). In this case, self-localization estimation and parking assistance processing by the estimation module 109, the vehicle control module 110, and the like, are started (S305). Details of the self-localization estimation and parking assistance processing will be described subsequently.

In addition, when the reception module 102 does not receive an operation giving an instruction on the start of parking assistance, for example, in a case where the cancel button 1202 displayed on the display device 120 is pressed by the user (S304: "No"), the self-localization estimation and the parking assistance processing are not started, and the processing of this flowchart is terminated.

Figure 15:
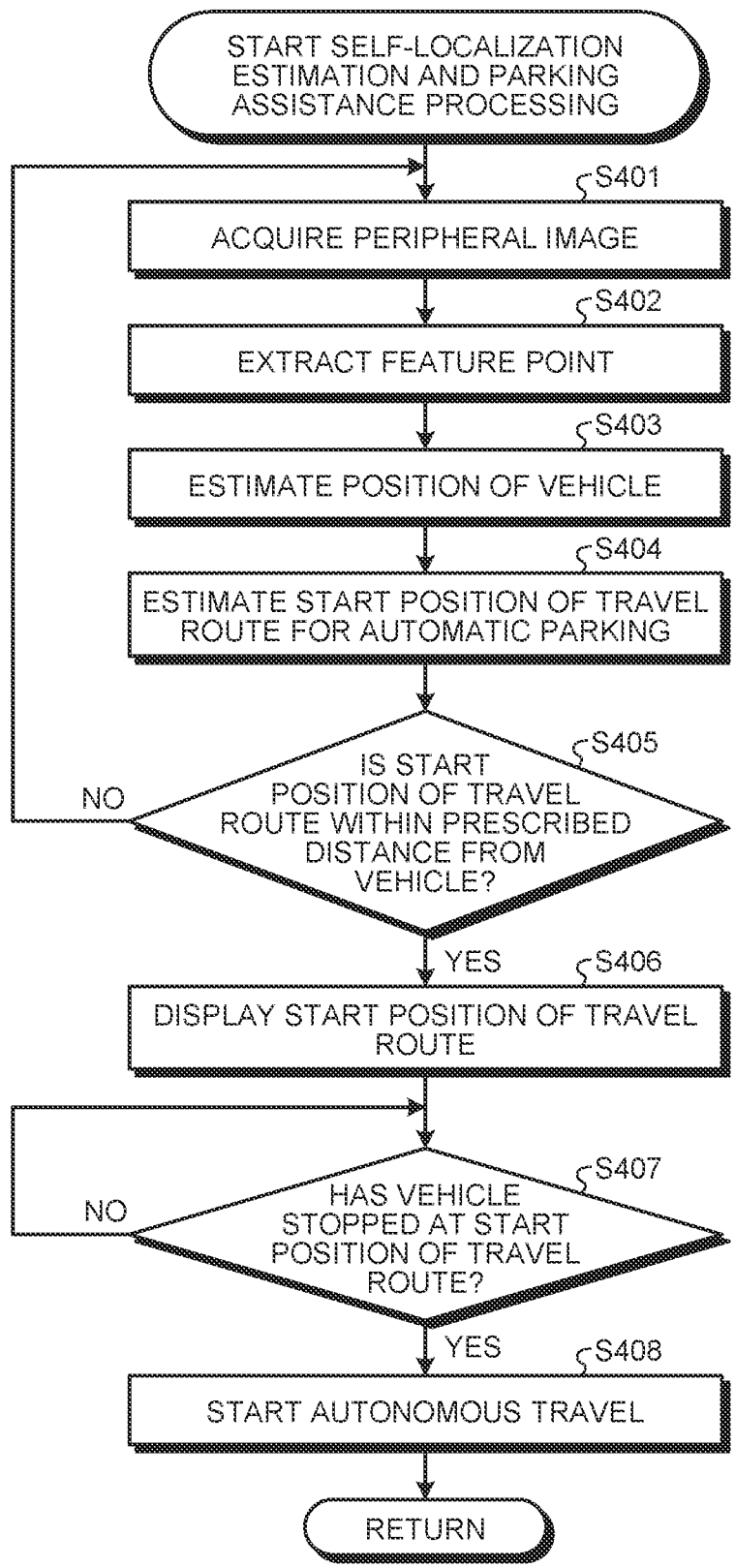
FIG. 15 is a flowchart illustrating an example of the flow of processing to perform a self-localization estimation and parking assistance, which is executed by the parking assistance device according to the first embodiment.

FIG. 15 is a flowchart illustrating an example of the flow of processing to perform a self-localization estimation and parking assistance, which are executed by the parking assistance device 100 according to the first embodiment.

First, the acquisition module 101 acquires peripheral images obtained by imaging the periphery of the vehicle 1 from the imaging device 16 (S401).

Next, the extraction module 108 extracts feature points from the peripheral images acquired by the acquisition module 101 (S402).

Next, the estimation module 109 reads, from the storage unit 112, feature points of the peripheral images captured during teaching travel, and estimates the position of the vehicle 1 on the basis of the feature points and the feature points extracted from the peripheral images by the extraction module 108 (S403).

The estimation module 109 also estimates the start position 900 of the travel route 80 of automatic parking on the basis of the travel route 80 and the feature points extracted from the peripheral images by the extraction module 108 (S404).

The estimation module 109 then determines whether or not the start position 900 of the travel route 80 is within a prescribed distance from the vehicle 1 on the basis of the estimated position of the vehicle 1 and the start position 900 of the travel route 80 (S405).

When the estimation module 109 determines that there is no start position 900 of the travel route 80 within the prescribed distance from the vehicle 1 (S405: "No"), the processing returns to S401.

Furthermore, when the estimation module 109 determines that the start position 900 of the travel route 80 is within the prescribed distance from the vehicle 1 (S405: "Yes"), the output control module 107 causes the display device 120 to display the start position 900 of the travel route 80 (S406). Using this display, the driver is able to accurately grasp the start position 900 of the travel route 80, and move the vehicle 1 to the start position 900 of the travel route 80 through manual driving.

While the vehicle 1 moves to the start position 900 of the travel route 80, the acquisition module 101 continuously acquires the peripheral images from the imaging device 16. Furthermore, the extraction module 108 extracts feature points from the acquired peripheral images. Furthermore, the estimation module 109 estimates the position of the vehicle 1 that changes according to the travel of the vehicle 1 on the basis of the movement of the feature points or the vehicle information extracted from the peripheral images.

The estimation module 109 then determines whether or not the vehicle 1 has stopped at the start position 900 of the travel route 80 (S407). When the vehicle 1 has not reached the start position 900 of the travel route 80 (S407: "No"), the estimation module 109 continues the processing to estimate the position of the vehicle 1 and repeats the determination of S407.

Then, when the vehicle 1 reaches the start position 900 of the travel route 80 and stops (S407: "Yes"), the vehicle control module 110 starts autonomous travel (S408). The vehicle control module 110 then causes the vehicle 1 to travel from the start position 900 of the travel route 80 to the parking space 910 along the travel route 80 through automated driving. Here, the processing of this flowchart is complete. Note that, although an example in which autonomous travel is started with a stop in the vicinity of the start position 900 as a trigger has been described here, a predetermined operation (pressing of a specific button, the release of a foot brake, or the like) by the user may be used again as a trigger for starting the autonomous travel.

Thus, in the parking assistance method executed by the parking assistance device 100 according to this embodiment, it is determined whether or not the vehicle 1 is located oriented with the prescribed azimuth at the calling point 920 registered in association with the travel route 80 on the basis of the absolute position and the azimuth in the travel direction of the vehicle 1. Therefore, with the parking assistance method according to this embodiment, it is possible to smoothly start preparations for parking assistance before the vehicle 1 arrives near the target parking space 910.

In addition, in the parking assistance method executed by the parking assistance device 100 according to this embodiment, when it is determined that the vehicle 1 is located oriented with the prescribed azimuth at the calling point 920, a notification is outputted to the user prompting an operation to start the parking assistance operation.

For example, after the vehicle 1 arrives near the start position 900 of the travel route 80, the parking assistance function is started, and when the vehicle 1 is moved to the parking assistance start position 900 through manual driving on the basis of the displayed screen guidance or the like, an unnecessary driving operation such as the wait time for the start of processing or adjustment of a place a short distance away for movement to the start position 900 may occur. As a result, it may take time to park, or the user may feel mental stress. In addition, even if the processing of self-localization estimation through image recognition is started at a point too far from the start position 900, there is a possibility that a feature point registered at the time of teaching travel and a peripheral image feature point do not match, making it difficult to estimate the position of the vehicle 1, or that another landscape similar to the periphery of the home 70 is erroneously recognized as a landscape around the home 70. In addition, if self-localization estimation processing through image recognition is always executed while the vehicle 1 is traveling, the processing load may be high, and the power consumption may increase.

On the other hand, in the parking assistance method of this embodiment, because a notification is outputted at the stage where the vehicle 1 reaches the calling point 920 before the vehicle 1 arrives near the start position 900, the user is able to perform an operation to start parking assistance at an appropriate point, and it is possible to reduce the wait time for starting the processing and smoothly guide the user to the start position 900.

In addition, in the parking assistance method according to this embodiment, because it is determined whether or not the vehicle 1 is located at the calling point 920 by using the absolute position of the vehicle 1, it is possible to reduce the occurrence of erroneous determination, for example, when the vehicle 1 is located at a different point of a landscape similar to the landscape around the calling point 920, in comparison with position determination that is based on peripheral image feature points.

Furthermore, in the parking assistance method of this embodiment, when the vehicle 1 is located at the calling point 920 and the azimuth in the travel direction of the vehicle 1 is a prescribed azimuth, a notification is outputted to the user prompting an operation to start parking assistance. Therefore, in the parking assistance method according to this embodiment, for example, when the vehicle 1 is not on the route toward the parking space 910, such as when the vehicle 1 is traveling on the road 40c illustrated in FIG. 4, the notification is not outputted. Further, in the parking assistance method according to this embodiment, even when the vehicle 1 is located at the calling point 920, the notification is not outputted when the azimuth in the travel direction of the vehicle 1 is not the prescribed azimuth. Therefore, with the parking assistance method according to this embodiment, it is possible to issue a notification to the user to prompt an operation to start parking assistance only when the vehicle 1 is heading toward the parking space 910, and it is possible to reduce user annoyance caused by a notification being issued at an unnecessary time.

Further, in the parking assistance method of this embodiment, when an operation to start parking assistance is received by the user, self-localization estimation is started on the basis of the peripheral image and the peripheral image captured during teaching travel, and the vehicle 1 is moved to the parking space 910 through autonomous travel on the basis of the position of the vehicle 1 estimated by the self-localization estimation and the registered travel route 80. Therefore, with the parking assistance method according to this embodiment, user convenience can be improved by automatically parking the vehicle 1 in response to an operation by the user.

Further, in the parking assistance method according to this embodiment, when the difference between the acquired absolute position of the vehicle 1 and the position of the calling point 920 is within a first prescribed range and the difference between the acquired azimuth in the travel direction of the vehicle 1 and the prescribed azimuth is within a second prescribed range, it is determined that the vehicle 1 is located oriented with the prescribed azimuth in the prescribed position. Generally, in manual driving by the user, an error may occur in the traveling position and in the azimuth in the travel direction of the vehicle 1. However, with the parking assistance method according to this embodiment, it is possible to output a notification in an appropriate position by allowing an error within a prescribed range.

Moreover, in the parking assistance method according to this embodiment, the calling point 920 and a prescribed azimuth are specified on the basis of a plurality of past travel histories of the vehicle 1, and are registered in association with the travel route 80. Therefore, with the parking assistance method according to this embodiment, it is possible to register the appropriate calling point 920 and the prescribed azimuth in accordance with the actual traveling position of the vehicle 1 through manual driving by the user.

In addition, in the parking assistance method according to this embodiment, the registered calling point 920 and the prescribed azimuth are changed on the basis of an operation by the user to correct the calling point 920 and the prescribed azimuth. Therefore, with the parking assistance method according to this embodiment, the user is able to adjust the calling point 920 and the prescribed azimuth to a desired position and desired azimuth. Furthermore, when there is a place where the GPS signal becomes unstable due to a building or a roof, for example, the user may avoid such a place and designate a position where the position information by the GPS can be stably acquired as the calling point 920.

Second Embodiment

In the first embodiment, the parking assistance device 100 outputted a notification prompting an operation to start parking assistance when the vehicle 1 was located at the calling point 920, which is a prescribed position, and was oriented with a prescribed azimuth. In the second embodiment, the parking assistance device 100 starts self-localization estimation processing for parking assistance when the vehicle 1 is located in a prescribed position and is oriented with a prescribed azimuth.

The vehicle 1 according to this embodiment has the same configuration as that of the first embodiment described with reference to FIGS. 1 and 2. The hardware configuration of the parking assistance device 100 according to this embodiment is the same as that of the first embodiment illustrated in FIG. 3.

As in the first embodiment, the parking assistance device 100 according to this embodiment is equipped with an acquisition module 101, a reception module 102, a travel history recording module 103, a registration processing module 104, a change processing module 105, a determination module 106, an output control module 107, an extraction module 108, an estimation module 109, a vehicle control module 110, a route recording module 111, and a storage unit 112. The reception module 102, the travel history recording module 103, the registration processing module 104, the change processing module 105, the output control module 107, the extraction module 108, the vehicle control module 110, and the route recording module 111 have functions similar to those of the first embodiment.

The determination module 106 of this embodiment has functions similar to those of the first embodiment, and hence determines whether or not the vehicle 1 is located oriented with a prescribed azimuth at a self-localization estimated start point, which is registered in association with the travel route 80, on the basis of the absolute position and the azimuth in the travel direction of the vehicle 1.

The self-localization estimated start point is an example of a prescribed position according to this embodiment. The method for registering and correcting the self-localization estimated start point is similar to the method for registering and correcting the calling point 920 according to the first embodiment.

The estimation module 109 according to this embodiment has functions similar to those of the first embodiment, and hence starts self-localization estimation on the basis of the peripheral images acquired by the acquisition module 101 and the peripheral images captured during teaching travel when the determination module 106 determines that the vehicle 1 is located at the self-localization estimated start point oriented with the prescribed azimuth.

The acquisition module 101 according to this embodiment has functions similar to those of the first embodiment, and hence acquires images obtained by imaging the periphery of the vehicle 1 when it is determined that the vehicle 1 is located in a prescribed position with a prescribed azimuth. The acquisition processing is an example of a fourth acquisition step in this embodiment.

Figure 16:
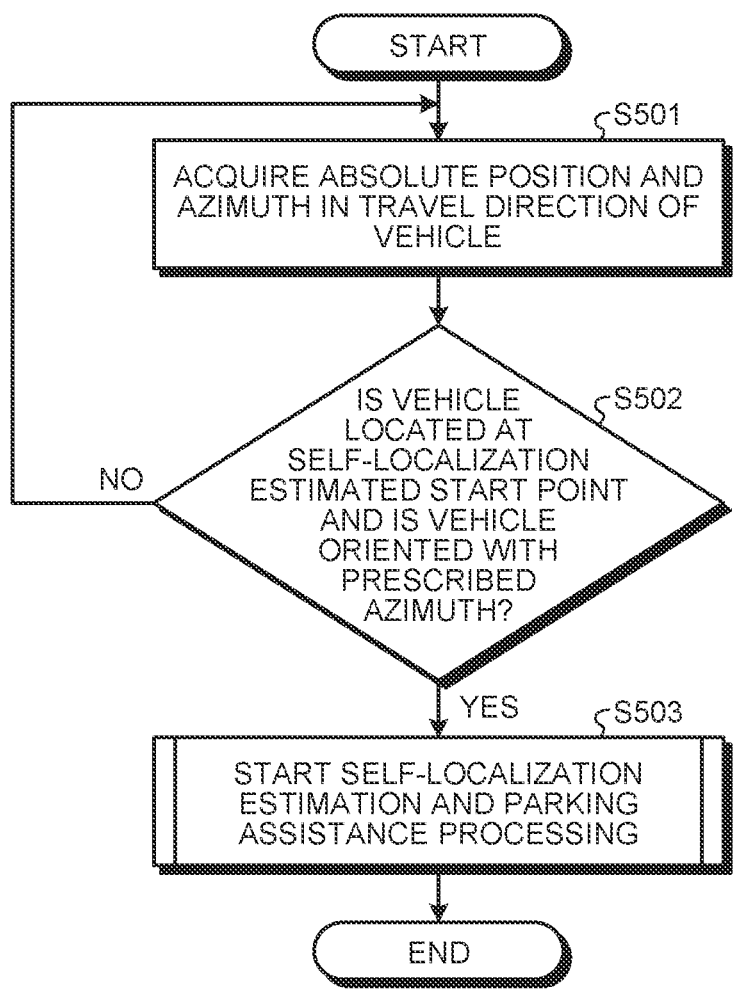
FIG. 16 is a flowchart illustrating an example of the flow of processing to perform an automatic start for the self-localization estimation and to perform parking assistance, which is executed by the parking assistance device according to a second embodiment.

FIG. 16 is a flowchart illustrating an example of the flow of processing to perform an automatic start for the self-localization estimation and to perform parking assistance, which is executed by the parking assistance device 100 according to the second embodiment.

The processing to acquire the absolute position and the azimuth in the travel direction of the vehicle 1 in S501 is similar to the processing of S301 of the processing of the first embodiment described in FIG. 14.

The determination module 106 then determines whether or not the vehicle 1 is located at the self-localization estimated start point and the vehicle 1 is oriented with a prescribed azimuth on the basis of the acquired absolute position and the azimuth in the travel direction of the vehicle 1, and the self-localization estimated start point and the prescribed azimuth that are registered in the storage unit 112 (S502).

When the determination module 106 determines that the vehicle 1 is not located at the self-localization estimated start point or that the vehicle 1 is not oriented with the prescribed azimuth (S502: "No"), the processing returns to S501.

When the determination module 106 determines that the vehicle 1 is located at the self-localization estimated start point and the vehicle 1 is oriented with the prescribed azimuth (S502: "Yes"), self-localization estimation and parking assistance processing by the estimation module 109, the vehicle control module 110, and the like are started (S503). The processing of this flowchart is then complete.

Figure 17:
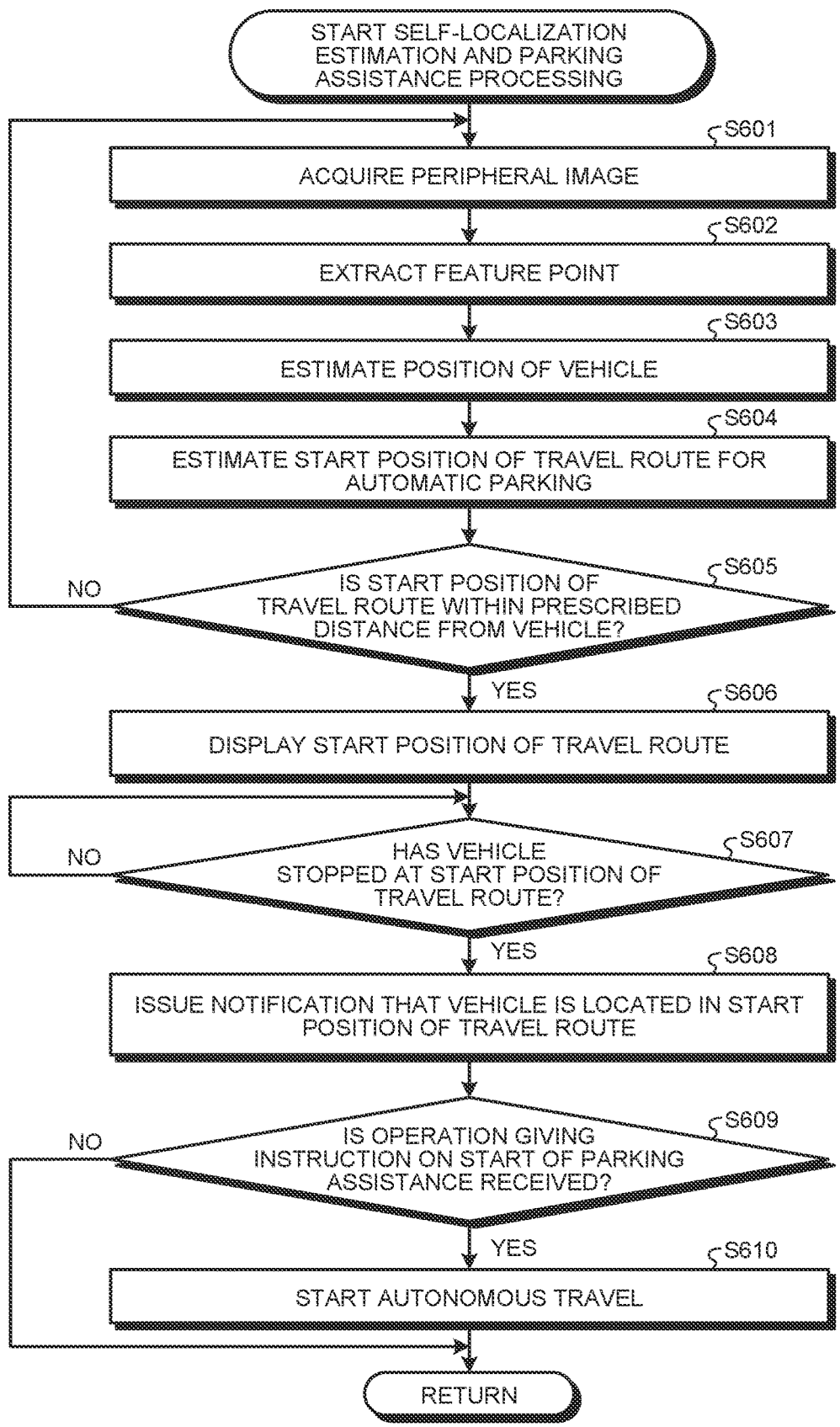
FIG. 17 is a flowchart illustrating an example of the flow of processing to perform the self-localization estimation and parking assistance, which is executed by the parking assistance device according to the second embodiment.

FIG. 17 is a flowchart illustrating an example of the flow of processing to perform the self-localization estimation and parking assistance, which is executed by the parking assistance device 100 according to the second embodiment.

The processing from the acquisition of the peripheral images in S601 to the determination of whether the vehicle 1 has stopped at the start position of the travel route 80 in S607 is similar to the processing of S401 to S407 of the first embodiment illustrated in FIG. 15.

Further, when the vehicle 1 reaches the start position 900 of the travel route 80 and stops (S607: "Yes"), the output control module 107 issues notification that the vehicle 1 is located at the start position 900 of the travel route 80 (S608). For example, the output control module 107 may cause the display device 120 to display a start button 1201 capable of receiving an operation to start parking assistance by the user and a cancel button 1202 capable of receiving an operation to cancel the start of parking assistance by the user.

In the first embodiment, the presence or absence of user intention to use parking assistance can be checked at a moment of the calling point 920. However, in this embodiment, because the self-localization estimation processing is performed from the self-localization estimated start point regardless of the presence or absence of user intention, the presence or absence of user intention to use the parking assistance is checked before the start of autonomous travel.

Further, when the start button 1201 displayed on the display device 120 is pressed by the user, for example, the reception module 102 receives an operation giving an instruction on the start of parking assistance (S609: "Yes"). In this case, the vehicle control module 110 starts autonomous travel (S610). The vehicle control module 110 then causes the vehicle 1 to travel from the start position 900 of the travel route 80 to the parking space 910 along the travel route 80 through automated driving.

In addition, when the reception module 102 does not receive an operation giving an instruction on the start of the parking assistance, for example in a case where the cancel button 1202 displayed on the display device 120 is pressed by the user (S609: "No"), the parking assistance using autonomous travel is not started, and the processing of this flowchart ends.

As described above, in the parking assistance method executed by the parking assistance device 100 of this embodiment, when it is determined that the vehicle 1 is located oriented with the prescribed azimuth at the self-localization estimated start point, the peripheral images obtained by imaging the periphery of the vehicle 1 are acquired, and the self-localization estimation is executed on the basis of the acquired peripheral images and the peripheral images captured during teaching travel. Therefore, with the parking assistance method according to this embodiment, it is possible to smoothly start preparations for parking assistance before the vehicle 1 arrives near the target parking space 910.

Third Embodiment

In the third embodiment, the parking assistance device 100 further guides the user to the start position 900 of the travel route 80 before the vehicle 1 arrives near the home 70.

The vehicle 1 according to this embodiment has the same configuration as that of the first embodiment described with reference to FIGS. 1 and 2. The hardware configuration of the parking assistance device 100 according to this embodiment is the same as that of the first embodiment illustrated in FIG. 3.

As in the first embodiment, the parking assistance device 100 according to this embodiment is equipped with an acquisition module 101, a reception module 102, a travel history recording module 103, a registration processing module 104, a change processing module 105, a determination module 106, an output control module 107, an extraction module 108, an estimation module 109, a vehicle control module 110, a route recording module 111, and a storage unit 112. The reception module 102, the travel history recording module 103, the registration processing module 104, the change processing module 105, the extraction module 108, the vehicle control module 110, and the route recording module 111 have functions similar to those of the first embodiment.

The output control module 107 of this embodiment has functions similar to those of the first embodiment, and hence when it is determined that the vehicle 1 is located with a prescribed azimuth at the calling point 920, causes the display device 120 to display an image indicating the start position 900 of the travel route 80. In this embodiment, an image indicating the start position 900 of the travel route 80 is referred to as a guide image. The processing to display the guide image is an example of a second output step.

FIG. 18 is a diagram illustrating an example of a guide image 600 according to the third embodiment. In the example illustrated in FIG. 18, the output control module 107 causes the display device 120 to display a first guide image 600a, a second guide image 600b, and a message M2. Note that, when the first guide image 600a and the second guide image 600b are referred to collectively, same are simply referred to as the guide images 600.

The first guide image 600a is, for example, an overhead image that depicts the periphery of the vehicle 1 from a virtual viewpoint located immediately above the vehicle 1. The overhead image is, for example, a synthesized image synthesized on the basis of the peripheral images of the vehicle 1 acquired by the acquisition module 101 during teaching travel. The composite image may be generated when the route recording module 111 records the travel route 80, or an image processor may be separately provided.

Further, in the first guide image 600a, a vehicle image 61a representing the vehicle 1, a first frame 62a representing the start position 900 of the travel route 80, and a second frame 63a representing the parking space 910 are depicted. Note that the first frame 62a and the second frame 63a are assumed to be in different display modes so that the user can easily distinguish between them. Although FIG. 18 is monochrome, different colors may be used such as, for example, green for the first frame 62a and black for the second frame 63a.

The second guide image 600b is, for example, an overhead image that depicts the periphery of the vehicle 1 from a virtual viewpoint located immediately above the vehicle 1. Similarly to the first guide image 600a, the second guide image 600b is a synthesized image synthesized on the basis of the peripheral images of the vehicle 1 acquired by the acquisition module 101 during teaching travel. Also in the second guide image 600b, a vehicle image 61b representing the vehicle 1, a first frame 62b representing the start position 900 of the travel route 80, and a second frame 63b representing the parking space 910 are depicted.

Further, the message M2 guides the position of the start position 900 where the vehicle 1 should stop at the start of parking assistance, such as "Please stop at the green frame position when parking at home", for example. Note that, in the example illustrated in FIG. 18, the "green frames" refers to the first frames 62a and 62b.

When the plurality of travel routes 80 have been registered, the output control module 107 causes the guide images 600 to display the start position 900 of the travel route 80 associated with the calling point 920 at which the vehicle 1 is determined to be located.

In the example illustrated in FIG. 18, the vehicle 1 stopping at the start position 900 is depicted by the first guide image 600a and the second guide image 600b, which have different virtual viewpoints, whereby the user can easily grasp the position where the vehicle 1 should be stopped. Note that the number and display mode of the displayed guide images 600 are not limited to the example illustrated in FIG. 18.

The display timing for the guide images 600 by the output control module 107 is, for example, after the start button 1201 is pressed by the user after the notification prompting the parking assistance start operation illustrated in FIG. 11 is outputted. Alternatively, the output control module 107 may display the guide image 600 illustrated in FIG. 18 instead of the notification prompting the parking assistance start operation illustrated in FIG. 11.

Thus, in the parking assistance method executed by the parking assistance device 100 according to this embodiment, when it is determined that the vehicle 1 is located with the prescribed azimuth at the calling point 920, the guide images 600 indicating the start position 900 of the travel route 80 are displayed on the display device 120. Therefore, with the parking assistance method according to this embodiment, it is possible to guide the user to stop the vehicle 1 at the start position 900, and to smoothly start automatic parking.

Note that, in this embodiment, the parking assistance device 100 displays the guide images 600 when the vehicle 1 is located at the calling point 920, but a point different from the calling point 920 may be registered as a point for displaying the guide images 600.

FIRST MODIFICATION EXAMPLE

In the above-described third embodiment, when it is determined that the vehicle 1 is located with the prescribed azimuth at the calling point 920, the guide images 600 are displayed on the display device 120, but the display timing for the guide images 600 is not limited thereto.

For example, when the reception module 102 receives a user operation designating home as the destination of a car navigation system, the output control module 107 may cause the display device 120 to display the guide images 600 indicating the start position 900 of the travel route 80. Note that the reception processing is an example of a fourth reception step. Further, the processing to display the guide images 600 in this modification example is an example of a third output step.

FIG. 19 as a diagram illustrating an example of the display timing for the guide images 600 according to the first modification example. As illustrated in FIG. 19, when the vehicle 1 travels from a point 930 away from the home 70 to the home 70, the user designates the home as the destination of the car navigation system. When the reception module 102 receives such a user operation, the output control module 107 causes the display device 120 to display the first guide image 600a. The second guide image 600b, and the message M2, as illustrated in FIG. 18, for example.

Note that, when a plurality of travel routes 80 have been registered, the output control module 107 guides the start position 900 of the travel route 80 whose start position 900 is closest to the absolute position of the vehicle 1 at the moment when the user performs the operation to designate the home as the destination of the car navigation system. In the example illustrated in FIG. 19, because the first start position 900a is closer to the point 930 than the second start position 900b, the output control module 107 displays the guide images 600 representing the position of the first start position 900a.

Alternatively, the output control module 107 may cause the display device 120 to display a list of the plurality of travel routes 80 so that the user can select a desired travel route 80. At that time, the names of the plurality of travel routes 80 may be displayed such as "a route storing from the right side of the parking space" and "a route storing from the left side of the parking space" so that the user can easily recognize the difference between each of the travel routes 80. Furthermore, the names may be settable by the user. Further, the output control module 107 may cause images indicating the shapes of a plurality of travel routes 80 to be superimposed and displayed on an overhead image or a map, and the user may be able to select the travel route 80 from the displayed images.

In the parking assistance method executed by the parking assistance device 100 of this modification example, because the start position 900 of the travel route 80 is presented to the user at the moment when it becomes clear that the vehicle 1 is heading toward the home 70, the user can easily stop the vehicle 1 in the start position 900, and automatic parking can be started smoothly.

Note that the configuration of this modification example may be combined with the configuration of the parking assistance device 100 of the first embodiment, or may be combined with the configuration of the parking assistance device 100 of the second embodiment. Alternatively, the configuration of the modification example is also applicable to a case where the parking assistance device 100 does not set the calling point 920 and the self-localization estimation point.

SECOND MODIFICATION EXAMPLE

In the above-described first embodiment, a technique for registering the calling point 920 on the basis of the past travel history has been described, but the technique for registering the calling point 920 is not limited thereto. For example, the user may register the calling point 920 and the prescribed azimuth on the screen of the display device 120. The display device 120 is an example of an input device provided near the driving seat of the vehicle 1.

More specifically, the reception module 102 receives an input of the calling point 920 and a prescribed azimuth by the user. The reception processing is an example of a third reception step. Further, the registration processing module 104 registers, in the storage unit 112, the calling point 920 and the prescribed azimuth, which are inputted by the user, in association with the travel route 80 registered using teaching travel. The registration processing is an example of a second registration step.

Furthermore, the output control module 107 of this modification example causes the display device 120 to display an operation screen enabling the user to designate the calling point 920 and the prescribed azimuth on a map.

Furthermore, for example, the user may perform the registration operation in a state where the vehicle 1 is located in a position that the user desires to register as the calling point 920. The registration operation of the calling point 920 is, for example, pressing of the operation button 141 or an operation of a screen button on the display device 120, or the like. In this case, the registration processing module 104 registers, as the calling point 920, the absolute position of the vehicle 1 at the moment when the reception module 102 receives the registration operation of the calling point 920 by the user. In this case, the registration processing, module 104 registers, as the prescribed azimuth, the azimuth in the travel direction of the vehicle 1 at the moment when the reception module 102 receives the registration operation of the calling point 920 by the user.

More specifically, the acquisition module 101 acquires the absolute position and the direction of the vehicle 1 when the reception module 102 receives an instruction to register the calling point 920 and the prescribed azimuth by the user. The acquisition processing is an example of a third acquisition step.

The registration processing module 104 registers, in association with the travel route 80, the absolute position and the azimuth in the travel direction of the vehicle 1, which are acquired by the acquisition module 101, as the calling point 920 and the prescribed azimuth. Note that, when a plurality of travel routes 80 have been registered, the output control module 107 may cause the display device 120 to display a list of the plurality of travel routes 80 so that the user can select a travel route 80 desired to register the calling point 920. In this case, the registration processing module 104 registers, in association with the travel route 80 selected by the user, the absolute position and the azimuth in the travel direction of the vehicle 1, which are acquired by the acquisition module 101.

Note that, when the user performs the registration operation of the calling point 920, the vehicle 1 may be stopped or may be traveling.

Note that the technique for registering the calling point 920 according to this modification example can also be employed to register the self-localization estimated start point in the second embodiment.

THIRD MODIFICATION EXAMPLE

In each of the above-described embodiments, the parking assistance device 100 acquires the absolute position of the vehicle 1 on the basis of a GPS signal. However, a feature other than the GPS may be further used to specify the absolute position of the vehicle 1. For example, the parking assistance device 100 may acquire the absolute position of the vehicle 1 on the basis of known map matching, or the movement amount of the vehicle 1 from the reference position by the vehicle speed pulse. Specifically, a dead reckoning (DR) feature using a wheel encoder, an inertial sensor, or the like, may also be adopted.

FOURTH MODIFICATION EXAMPLE

In each of the above-described embodiments, the display device 120 and the operation unit are mounted on the vehicle 1, but may also be provided outside the vehicle 1. For example, the display device 120 and the operation unit may be a tablet terminal or a mobile terminal such as a smartphone that is capable of communicating with the parking assistance device 100 in a wireless or wired manner. Note that it is sufficient if the mobile terminal and the parking assistance device 100 of the vehicle 1 are not directly connected, and may indirectly transmit and receive data and a control signal to and from the parking assistance device 100 via a server device or a cloud environment.

When the display device 120 and the operation unit are a tablet terminal or the like, the driver may use the tablet terminal or the like in the vehicle or may use the tablet terminal or the like in a state of disembarking from the vehicle 1.

For example, in the above-described third modification example, an operation screen, which enables the user to designate the calling point 920 and the prescribed azimuth on a map, may be displayed on the display of the mobile terminal. In this case, the reception module 102 receives the calling point 920 and the prescribed azimuth, which are inputted by the user, from a mobile terminal that is capable of communicating with a parking assistance device of the vehicle 1. For example, the user may use the mobile terminal inside the vehicle 1, or may use the mobile terminal outside the vehicle 1, for example, at home 70 or the like.

Alternatively, when the vehicle 1 is equipped with a head-up display, the head-up display may be an example of the display unit. For example, the windshield 180 of the vehicle 1 may be a head-up display capable of displaying an image by projecting the image using a projection device (not illustrated).

FIFTH MODIFICATION EXAMPLE

Moreover, some of the functions of the parking assistance device 100 in each of the above-described embodiments and modification examples may be executed by an information processing device provided outside the vehicle 1. The information processing device provided outside the vehicle 1 is, for example, a mobile terminal such as a smartphone, a PC, a server device, or the like. Note that the information processing device may be provided in a cloud environment.

With the parking assistance method and the parking assistance device according to the present disclosure, preparations for parking assistance can be started smoothly before a vehicle arrives near a target parking position.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking assistance method of performing autonomous travel of a vehicle based on a travel route generated using teaching travel by a driver, the parking assistance method comprising:
    acquiring an absolute position and an azimuth in a travel direction of the vehicle;
    determining, based on the absolute position and the azimuth in the travel direction, whether or not the vehicle is located and oriented with a prescribed azimuth in a prescribed position, which are registered in association with the travel route; and
    outputting, when the vehicle is located and oriented with the prescribed azimuth in the prescribed position, a notification to a user to prompt an operation to start parking assistance.

2. The parking assistance method according to claim 1, further comprising:
    receiving the operation by the user to start the parking assistance;

acquiring an image obtained by imaging a periphery of the vehicle;

performing a self-localization estimation based on the image and data generated from the peripheral image or a peripheral image captured during the teaching travel; and moving the vehicle to a parking position through autonomous travel based on the travel route and a position of the vehicle estimated by the self-localization estimation.

3. The parking assistance method according to claim 1, further comprising:

receiving the operation by the user to start the parking assistance;

acquiring an image obtained by imaging a periphery of the vehicle;

performing a self-localization estimation based on the image and data generated from the peripheral image; and moving the vehicle to a parking position through autonomous travel based on the travel route and a position of the vehicle estimated by the self-localization estimation.

4. The parking assistance method according to claim 1, wherein the determining includes determining that the vehicle is located and oriented with the prescribed azimuth in the prescribed position when a first difference between the acquired absolute position of the vehicle and the prescribed position is within a first prescribed range and a second difference between the acquired azimuth in the travel direction of the vehicle and the prescribed azimuth is within a second prescribed range.

5. The parking assistance method according to claim 1, wherein the parking assistance method determines that the vehicle is located and oriented with the prescribed azimuth in the prescribed position when a first difference between the acquired absolute position of the vehicle and the prescribed position is within a first prescribed range and a second difference between the acquired azimuth in the travel direction of the vehicle and the prescribed azimuth is within a second prescribed range.

6. The parking assistance method according to claim 2, wherein the determining includes determining that the vehicle is located and oriented with the prescribed azimuth in the prescribed position when a first difference between the acquired absolute position of the vehicle and the prescribed position is within a first prescribed range and a second difference between the acquired azimuth in the travel direction of the vehicle and the prescribed azimuth is within a second prescribed range.

7. The parking assistance method according to claim 1, further comprising:

specifying the prescribed position and the prescribed azimuth based on a plurality of past travel histories of the vehicle and registering the prescribed position and the prescribed azimuth in association with the travel route.

8. The parking assistance method according to claim 1, further comprising:

specifying the prescribed position and the prescribed azimuth based on a plurality of past travel histories of the vehicle and registering the prescribed position and the prescribed azimuth in a memory.

9. The parking assistance method according to claim 2, further comprising:

specifying the prescribed position and the prescribed azimuth based on a plurality of past travel histories of the vehicle and registering the prescribed position and the prescribed azimuth in association with the travel route.

10. The parking assistance method according to claim 4, further comprising:

specifying the prescribed position and the prescribed azimuth based on a plurality of past travel histories of the vehicle and registering the prescribed position and the prescribed azimuth in association with the travel route.

11. The parking assistance method according to claim 7, further comprising:

receiving a user operation to correct the prescribed position and the prescribed azimuth; and changing the registered prescribed position and the registered prescribed azimuth based on the user operation to correct the prescribed position and the prescribed azimuth.

12. The parking assistance method according to claim 1, further comprising:

receiving an input by a user of the prescribed position and the prescribed azimuth; and registering the prescribed position and the prescribed azimuth inputted by the user in association with the travel route registered using the teaching travel.

13. The parking assistance method according to claim 12, wherein the receiving the input by the user includes receiving the prescribed position and the prescribed azimuth inputted by the user, from an input device provided near a driving seat of the vehicle.

14. The parking assistance method according to claim 12, further comprising:

acquiring the absolute position and the azimuth in the travel direction of the vehicle when an instruction by the user to register the prescribed position and the prescribed azimuth is received in the receiving the input by the user, wherein the registering the prescribed position and the prescribed azimuth inputted by the user includes registering, in association with the travel route, the absolute position and the azimuth in the travel direction of the vehicle, as acquired, as the prescribed position and the prescribed azimuth.

15. The parking assistance method according to claim 12, wherein the receiving the input by the user includes receiving the prescribed position and the prescribed azimuth, which are inputted by the user, from a mobile terminal that is capable of directly or indirectly communicating with a parking assistance device of the vehicle.

16. The parking assistance method according to claim 1, further comprising:

acquiring an image obtained by imaging a periphery of the vehicle when the vehicle is located and oriented with the prescribed azimuth in the prescribed position; and starting a self-localization estimation based on the image and data generated from the image or a peripheral image captured during the teaching travel.

17. The parking assistance method according to claim 1, further comprising:

causing a display to display an image indicating a start position of the travel route when the vehicle is located and oriented with the prescribed azimuth in the prescribed position.

18. The parking assistance method according to claim 1, further comprising:
   receiving a user operation to designate a home as a destination of a car navigation system; and
   causing a display to display an image indicating a start position of the travel route when the user operation to designate the home as the destination of the car navigation system is received.

19. A parking assistance device that executes parking assistance for performing autonomous travel of a vehicle based on a travel route generated using teaching travel by a driver, the parking assistance device comprising:
   a memory; and
   a processor coupled to the memory and configured to:
      acquire an absolute position and an azimuth in a travel direction of the vehicle; and
      determine, based on the absolute position and the azimuth in the travel direction, whether or not the vehicle is located oriented with a prescribed azimuth in a prescribed position, which are registered in association with the travel route; and
   outputting, when the vehicle is located and oriented with the prescribed azimuth in the prescribed position, a notification to a user to prompt an operation to start parking assistance.

20. A parking assistance method of performing autonomous travel of a vehicle based on a travel route generated using teaching travel by a driver, the parking assistance method comprising:
   acquiring a position of the vehicle and an azimuth in a travel direction of the vehicle; and
   outputting, based on the position and the azimuth in the travel direction, when the vehicle is located and oriented with a prescribed azimuth in a prescribed position, a notification to a user to prompt an operation to start parking assistance,
   wherein the prescribed position is located within a range of a prescribed distance from a start position of the travel route.

* * * * *